US008674871B2

(12) United States Patent
Denis et al.

(10) Patent No.: US 8,674,871 B2
(45) Date of Patent: Mar. 18, 2014

(54) METHOD AND SYSTEM FOR AIDING ENVIRONMENTAL CHARACTERIZATION BY ULTRA-WIDEBAND RADIOFREQUENCY SIGNALS

(75) Inventors: Benoît Denis, Grenoble (FR); Vincenzo La Tosa, Manfredonia (IT); Bernard Uguen, Servon sur Vilaine (FR); Friedman Tchoffo-Talom, Saint Renan (FR)

(73) Assignee: Commissariat a l'Energie Atomique, Paris (FR)

( * ) Notice: Subject to any disclaimer, the term of this patent is extended or adjusted under 35 U.S.C. 154(b) by 509 days.

(21) Appl. No.: 12/809,226

(22) PCT Filed: Dec. 15, 2008

(86) PCT No.: PCT/EP2008/067569
§ 371 (c)(1),
(2), (4) Date: Oct. 29, 2010

(87) PCT Pub. No.: WO2009/077510
PCT Pub. Date: Jun. 25, 2009

(65) Prior Publication Data
US 2011/0163905 A1     Jul. 7, 2011

(30) Foreign Application Priority Data
Dec. 18, 2007  (FR) .................... 07 08831

(51) Int. Cl.
*G01S 13/00*    (2006.01)
(52) U.S. Cl.
USPC ............... 342/21; 342/22; 342/27; 342/90; 342/192
(58) Field of Classification Search
USPC ............ 342/21, 22, 27, 28, 90, 192
See application file for complete search history.

(56) References Cited

U.S. PATENT DOCUMENTS 3,714,573 A * 1/1973 Grossman .................. 342/387
5,119,104 A * 6/1992 Heller ...................... 342/450
(Continued)

FOREIGN PATENT DOCUMENTS

WO    WO 2007/134410      11/2007
WO    WO 2007134410 A1 *  11/2007

OTHER PUBLICATIONS

X. Liang, et al: "New Precision Wideband Direction Finding Antenna" IEE Procl-Microw. Antennas Propag. vol. 148, No. 6, Dec. 2001, pp. 363-364.

Nerguizian, Chahé, et al: "Geolocation in Mines with an Impulse Response Fingerprinting Technique and Neural Networks" 0-7803-8521-7/04 IEEE, 2004, pp. 3589-3594.

(Continued)

*Primary Examiner* — Peter Bythrow
(74) *Attorney, Agent, or Firm* — LaRiviere, Grubman & Payne, LLP

(57) ABSTRACT

The invention relates to environmental characterization on the basis of an Ultra Wide Band (UWB) radiofrequency communication network. Pulses are emitted and the waveform received is compared with predicted waveforms corresponding to well determined interactions between the wave and its environment. The comparison is done by searching for maximum temporal correlation. The interactions can be notably reflections of the wave on walls or obstacles. The deformations are very dependent on the nature of the materials and directions in which the pulses are emitted and received. If predicted waveforms are stored for various pairs of direction of emission and of reception, it is possible through these correlation operations to find where a wall which gave rise to a reflection is situated.

18 Claims, 14 Drawing Sheets

(56) References Cited

U.S. PATENT DOCUMENTS

| | | | |
|---|---|---|---|
| 5,796,363 A * | 8/1998 | Mast | 342/22 |
| 6,133,876 A * | 10/2000 | Fullerton et al. | 342/375 |
| 6,218,979 B1 * | 4/2001 | Barnes et al. | 342/28 |
| 6,222,481 B1 * | 4/2001 | Abrahamson et al. | 342/90 |
| 6,297,773 B1 * | 10/2001 | Fullerton et al. | 342/457 |
| 6,300,903 B1 * | 10/2001 | Richards et al. | 342/450 |
| 6,806,821 B2 * | 10/2004 | McLemore | 342/22 |
| 7,129,886 B2 * | 10/2006 | Hall et al. | 342/28 |
| 7,199,750 B2 * | 4/2007 | Bourdelais et al. | 342/90 |
| 7,256,727 B2 * | 8/2007 | Fullerton et al. | 342/28 |
| 7,719,280 B2 * | 5/2010 | Lagae et al. | 324/322 |
| 2003/0069025 A1 * | 4/2003 | Hoctor et al. | 455/456 |
| 2004/0178942 A1 * | 9/2004 | McLemore | 342/22 |
| 2005/0248482 A1 * | 11/2005 | Goodman et al. | 342/180 |
| 2006/0152404 A1 * | 7/2006 | Fullerton et al. | 342/28 |
| 2006/0238407 A1 * | 10/2006 | Bourdelais et al. | 342/90 |
| 2007/0024488 A1 * | 2/2007 | Zemany et al. | 342/22 |
| 2007/0153881 A1 * | 7/2007 | Arslan | 375/150 |
| 2007/0182618 A1 * | 8/2007 | Fullerton et al. | 342/28 |
| 2008/0129581 A1 * | 6/2008 | Douglass et al. | 342/52 |
| 2008/0252293 A1 * | 10/2008 | Lagae et al. | 324/318 |
| 2011/0177786 A1 * | 7/2011 | Marano et al. | 455/67.11 |
| 2012/0092207 A1 * | 4/2012 | Fullerton et al. | 342/27 |

OTHER PUBLICATIONS

R. Zetik, et al: "Imaging and Propagation Environment by UWB Channel Sounding" Electronic Measurement Research Lab, Technische Universität Ilmenau, PF 100565, D-98684 Ilmenau, Germany.

Dumanian A J et al: "Enhanced Detection and Classification of Buried Mines with an UWB Multistatic GPR", Antennas and Propagation Society Symposium, 2005, IEEE Washington, DC, Jul. 3-8, 2005, Piscataway, NJ: IEEE, US, vol. 3B, Jul. 3, 2005, pp. 88-91, XP010860113, ISBN: 978-0-7803-8883-3, the whole document.

Frank Althaus, et al: "UWB Geo-Regioning in Rich Multipath Environment" 0-7803-9152-7/05 2005 IEEE, pp. 1001-1005.

Wenyu Guo et al: "Indoor Mapping and Positioning Using Impulse Radios" Position, Location and Navigation Symposium, 2006 IEEE/ION Coronado, CA, Apr. 25-27, 2006, Piscataway. NJ, pp. 153-163, XP010924855 ISBN: 978-0-7803-9454-4, the whole document.

Wenyu Guo et al: "Indoor Mapping and Location-Sensing Using an Impulse Radio Network" IEEE, pp. 296-301.

Yves Lostanlen et al: "Introduction of Diffuse Scattering to Enhance Ray-Tracing Methods for the Analysis of Deterministic Indoor UWB Radio Channels (Invited Pager)" Electromagnetics in Advanced Applications, 2007, ICEAA 2007. International Conference on IEEE, PI, Sep. 1, 2007, pp. 903-906, XP031163874 ISBN: 978-1-4244-0766-8 abstract.

* cited by examiner

METHOD AND SYSTEM FOR AIDING ENVIRONMENTAL CHARACTERIZATION BY ULTRA-WIDEBAND RADIOFREQUENCY SIGNALS

PRIORITY CLAIM

This application claims priority to PCT Patent Application Number PCT/EP2008/067569, entitled Method and System for Aiding Environmental Characterization by Ultra-Wideband Radiofrequency Signals, filed on Dec. 15, 2008.

FIELD OF THE INVENTION

The invention relates to wireless communication networks utilizing Ultra Wide Band (UWB) technology.

BACKGROUND OF THE INVENTION

UWB radiofrequency signals are signals whose bandwidth (defined at −10 dB of the maximum of the spectral power density) is greater than 500 MHz or than 20% of the central frequency. In particular, certain so-called impulse systems (Impulse Radio—UWB) provide for the transmission of coded and/or modulated trains of brief pulses (of the order of an ns).

UWB technology is on the way to establishing itself as favored physical layer of short and medium range wireless digital communication networks, such as wireless personal area networks (WPANs) and sensor networks or WSNs (for Wireless Sensor Networks).

The present invention proposes that means for aiding the characterization of the environment in which the emitter/receiver nodes of a UWB wireless communication network are situated be incorporated into the network, either for the purposes of optimizing the UWB communication network, or for other purposes related for example to the utilization of the knowledge of the configuration of the environment (for example the geometric configuration of the walls, their constituent materials) with the aim of providing integrated services within a communication network.

In the first case, where it is desired to aid the optimization of a UWB network, it is understood that it is particularly indicated to obtain an item of information about physical characteristics, notably geometric characteristics, of the environment (presence of obstacles to transmission which attenuate the signals, presence of reflecting objects which disturb transmission by creating multi-paths). This for example enables a network to better adapt to its environment by taking into account the real environment whose characteristics it has itself logged; the adaptation can be done for example by using, on reception, filters suitably matched to the transmission channel or by acting on the routing of the communications in the network.

In the second case, it is desired to acquire information about the environment with the aim of providing the users of the network with an additional service. UWB radio emitters/receivers forming part of a UWB communication network then determine a geometric configuration (presence of walls, of partitions, position, etc.) and electromagnetic configuration (that is to say the nature of these walls) of the environment; this may be with the aim of determining whether the environment is in a potentially dangerous state or with the aim of detecting a modification of the configuration (for example an intrusion); this may also be with the aim of informing the other, potentially distant, nodes of the network about the current state of the environment. These nodes can thereafter process the information dependent on the topology of the environment with other data measured at various points of the sensor network (for example, temperature, pressure, etc.).

The expression "characterization of the environment" is understood to mean the determination of configurations or changes of configuration of the physical elements which are present in the environment of the emitter-receiver nodes of the communication network.

In the prior art, it has already been proposed that radio mapping be carried out inside buildings ("indoor mapping") by means of emitters-receivers dedicated to this mapping but not by using an in situ communications network having an aim other than this mapping. This mapping is based on an analysis of the echoes of pulses sent by an emitter. The instants of arrival of the various multi-path echoes resolved by the receiver are associated with the multiple reflections which may have occurred between emission and reception. These reflections occur on walls whose relative position and whose orientation with respect to an emitter/receiver pair (potentially co-located) can then be determined by means of simple geometric relations. The article by W. Guo and N. P. Filer "2D Indoor Mapping and Location Sensing Using an Impulse Radio Network" in IEEE Seminar on Ultra Wideband Systems, technologies and Applications, 2006 pp. 211-215 London, April 2006, or also the article by W. Guo, N. P. Filer and R. Zetik, entitled "Indoor Mapping and Positioning Using Impulse Radios" in IEEE Position Location and Navigation Symposium, pp. 153-163, April 2006, propose this type of scheme.

Another technique has also been proposed: it consists in using a multiplicity of receivers dedicated to characterization, at known positions, so as to determine the presence and the position, in the environment, of objects liable to reflect the waves. See for example R. Zetik, J. Sachs, R. Thöma, "Imaging of Propagation Environment by UWB Channel Sounding", COST 273 TD(05) 058, Bologna, January 2005.

Use has also been made of environmental signature techniques in which there is a receiver: in a training phase, profiles of power received as a function of time are collected during the emission of pulses by an emitter, doing so by placing receivers in several regions in space. Mean profiles are stored for each region in space, and, during the use of a receiver, a profile of power received is compared with the previously stored profiles, so as to deduce therefrom the region in space in which the receiver is probably situated. See for example the article by F. Althaus, F. Troesch and A. Wittneben, "UWB Geo-Regioning in Rich Multipath Environment, IEEE 2005.

Sophisticated schemes have also been proposed, which use neural networks to recognize patterns of multi-paths resolved on reception, with the aim of allowing positioning of the receiver in a pre-established environment. See for example C. Nerguizian, C. Despins, S. Affes, "Geolocation in Mines with an Impulse Response Fingerprinting Technique and Neural Networks", IEEE VTC04-Fall, Los Angeles, vol. 5 p 3589-3594, September 2004.

All these techniques are specific detection techniques, using emitters or receivers dedicated to the detection of objects in the environment.

Other examples of radiofrequency systems for environment reconstruction have also been proposed, for example in patent application EP 2003/721985 or in patent application US 2006 405167A. These systems do not utilize the characteristic of deformation of a pulse subsequent to radiation or to capture by a UWB antenna.

In patent application US 2006 405167A "Method and apparatus for utilizing RF signals to create a site specific representation of an environment", there is described a scheme comprising the estimation of the distance traveled by the wave between the emitter and the receiver in the course of successive emissions during which an emission antenna is rotated 5° by 5° so as to scan an observation space. The algorithm described in this prior application makes provision to previously perform an estimation of the distance traveled (for example on the basis of a measurement of the outward-return flight time of the signal transmitted), and then a link budget taking account of the gain (in power) of the antennas and of the propagation losses (path loss), and finally to associate the additional energy losses observed on reception (that is to say the additional losses with respect to the initial budget) with the type of channel, or indeed with the electromagnetic interaction phenomena. This algorithm does not take into account the deformation of pulses to deduce environmental characteristics therefrom.

Finally, in patent application US 2003 714046A, the determination of reception angles relies on the use of a network of n antennas, which are capable of associating the signal received with one of the 2n sectors delimited by the antennas themselves. The determination of deformations of impulse waveforms is not suggested.

The prior art techniques allow environmental characterization (sometimes coarse), but they use emitters and receivers dedicated to this characterization and not a multi-node communications network dedicated mainly to the communication of information between nodes. Moreover, none of the schemes cited above relies on the deformations undergone by the waveforms associated with the paths resolved on reception.

SUMMARY OF THE INVENTION

The present invention is based on the following considerations: if a radiofrequency pulse is applied by an emitter to an emission antenna, it will reach the receiver while being deformed to a greater or lesser extent not only because of the transfer function of the emission antenna and the reception antenna but also as a function of the presence of reflecting, or diffracting, or absorbing obstacles in its path, and as a function of the nature of these obstacles; for example, a brick wall will reflect the wave by deforming it in a certain manner, whereas a concrete wall, a wooden door, or a glass window will produce another deformation. In the same manner, absorption of the wave or diffraction on a wall corner will produce other deformations. The deformations are therefore related to types of interaction between the wave and the environment. By storing in a memory certain possible signal deformations, by category of interaction between the wave and an obstacle, it will be possible subsequently to compare a waveform received with stored forms, that is to say with predicted waveforms related to interactions identified beforehand. This database of waveforms, defined as "elementary waveforms", can be supplemented with a facility for prediction on the fly, relying on descriptors of electromagnetic characteristics of different materials, notably the transfer functions, in the frequency domain, of the materials as a function of the direction of incidence on the surface (a priori deterministic), as well as on the knowledge of certain probability distributions relating to the geometric characteristics (a priori statistical). A portion of waveform received may thus be considered as resulting from a probable interaction and it will be considered that an obstacle whose material corresponds to the predicted form is probably present in the environment. By supplementing the information thus obtained with an analysis of the temporal position of the waveform portion which gave rise to this result, it is possible to obtain information regarding propagation time, therefore information regarding obstacle relative position (with respect to the radio link). This comparison of waveforms received with predicted waveforms can be done for several successive portions of one and the same signal received, these various portions corresponding to various paths of the electromagnetic wave in the case of multiple interactions. Finally, it must be understood that UWB emission or reception antennas have a non-uniform spatial radiation pattern in the operating band and that the signal deformations which result therefrom in the time domain are also related to the direction of emission and to the direction of reception, so that it is possible to store predicted forms for various directions, compare the signal received with the predicted forms, and deduce therefrom directions of emission and reception of the wave. It has been found that such a technique can be implemented perfectly well within a UWB communication network rather than be performed by a detection system designed specifically for environmental characterization.

If the novel method according to the invention is summarized, it is consequently possible to say that a method is herein proposed for aiding environmental characterization using an ultra-wideband multi-node wireless communication network (that is to say having at least two nodes, but in practice at least three nodes) serving for communication purposes other than the emission of pulses related to environmental characterization, the method comprising the emission of ultra-wideband (UWB) impulse radiofrequency signals by a radio emitter node having an emission antenna and the reception of corresponding signals by a radio receiver node having a reception antenna, the method comprising:

the storage, in a memory associated with the receiver, of a series of descriptors of predicted elementary waveforms, each descriptor corresponding to an elementary waveform expected in the receiver for a determined interaction between the electromagnetic wave emitted by the emission antenna and surfaces potentially present in the environment and which may affect the transmission of this wave in its path up to its reception by the receiver, the digitization of the signal received and the determination of one or more temporal portions of the waveform of signal received which, because of their temporal distribution of energy, are apt to contain one of the predicted waveforms, the comparison between on the one hand a descriptor of the signal received for at least one of these temporal portions and on the other hand several descriptors of predicted waveforms, which descriptors are stored in the memory or calculated on the fly on the basis of the stored descriptors, the selection of at least one descriptor for which the comparison indicates a resemblance between the predicted form and the temporal portion of form received, the storage of an item of information about the descriptor thus selected, representing an item of information regarding presence and position in the environment of a noteworthy object which causes an interaction corresponding to the interaction associated with the selected descriptor.

The series of impulse signals is preferably a series emitted during the header of a communication message sent by the radio emitter node over the network and received by the radio receiver node, so as to be able to perform an environmental characterization even during the current use (for purposes other than characterization) of the communication link.

Each waveform descriptor is the result of a transformation applied to a digitized waveform.

The predicted waveforms are obtained on the basis of a prior characterization of the antennas (measurements or simulations), and by means of a calculation integrating the filtering effects due to certain interaction histories.

The waveform descriptors can consist of a digital representation of a waveform in the time domain; but they can also consist of representations other than the temporal waveform itself, for example a vector representation of characteristics indicative of the waveform, or else a non-temporal representation, for example a representation in frequency space, such as a Fourier transform of the waveform. The predicted waveforms are obtained by prior measurements and/or with the aid of simulations by calculation.

A predicted-waveform descriptor can be associated with a determined pair of directions, for example in the case of the prediction of a waveform corresponding to a direct path. If the context of application is restricted to a simple two-dimensional case, these directions correspond respectively to a possible angle of emission AE, referenced with respect to a characteristic axis of the emission antenna, and a possible angle of reception AR, referenced with respect to a characteristic axis of the reception antenna, the waveform associated with this descriptor being the signal waveform predicted in the case where the reception antenna receives at the angle AR an impulse electromagnetic wave emitted by the emission antenna at the angle AE. Generally, predicted waveforms will be stored for various pairs of directions, just as it will be possible to consider various materials of reflecting obstacles (for each pair of directions) and several angles of incidence on these obstacles, so as to avail oneself of a database of elementary waveforms which is indexed on the group or quartet of four parameters AE, AR, material and angle of incidence. It will also be possible to have in memory the descriptors of the electromagnetic characteristics of various materials (a priori deterministic) as well as certain probability distributions relating to the geometric characteristics (a priori statistical). As has already been indicated, instead of the entire digitized waveform, it is possible to envisage other descriptors of waveforms, for example in the form of representative frequency characteristics, for each AE/AR pair and for a material at a given incidence. These alternative descriptors could feed an algorithm for estimating the most similar waveform (and/or parameters which are associated with it, such as the angles AE/AR), by means of non-linear relations. Indeed, the complex nature of certain real electromagnetic interactions could be interpreted more pertinently by tools for non-linear estimation such as, for example, neural networks.

The information regarding obstacle presence and position, which is stored after a positive result of comparison with the predicted waveforms, will more often than not represent a position and an orientation of a surface reflecting the electromagnetic waves, the position being the intersection of a straight line passing through the emission antenna and directed along the direction of emission AE corresponding to the selected descriptor and of a straight line passing through the reception antenna and directed along the direction of reception AR corresponding to the selected descriptor, and the orientation of the reflecting surface being that of a plane perpendicular to the bisector of these two straight lines. In an equivalent manner, since it is sought to estimate the angles of incidence, the reflecting surfaces can be estimated as being the surfaces orthogonal to the bisectors of the angles of incidence.

It will be noted that for a wave path with a single reflection on the reflecting obstacle, this noteworthy obstacle position is determined by virtue of the characteristic directions of the identified descriptor, without needing knowledge of the temporal position of the wave portion received which gave rise to a comparison. However, it is also possible to use this knowledge of the temporal position to establish or confirm the information regarding position of the noteworthy object; indeed, the temporal position is related to a wave propagation time, and the propagation time represents the distance between the emitter and the receiver along the path reflected by the obstacle.

This determination of characteristics of the environment will preferably be performed by processing successive pulses emitted by the emission antenna. If the emission antenna and the reception antenna are carried by two nodes of a communication network operating under UWB, a series of pulses can be for example emitted during the header of a communication message sent by the emitter to the receiver (for example a channel synchronization and/or estimation header), so as to perform an environmental characterization during the current use of the communication link between the emission antenna and the reception antenna.

In the case where the emission antenna emits several identical successive impulse signals shifted by determined time intervals, a coherent integration of the signals received is preferably performed by compensating at the receiver level for the time intervals which separate them, so as to produce an equivalent signal received having an improved signal/noise ratio, and the waveform of this equivalent signal received is used to perform the comparisons with the predicted waveforms.

Preferably, after selection of a particular descriptor for a determined temporal portion of the waveform received, the predicted waveform corresponding to this descriptor is subtracted from the waveform received, while tailoring it to this temporal portion, and the determination of temporal portions and the comparison with predicted forms is recommenced, using the result of this subtraction as signal received. This subtraction can be done in an iterative manner by recommencing each time a determination of temporal portions, a comparison with predicted forms, and a descriptor selection.

A pulse driving the emission antenna can for example have the temporal form of a sinusoid multiplied by a Gaussian function.

Finally, it will be noted that the comparison between the waveform extracted from the signal received and the predicted waveforms (whose descriptors are in the memory) can be done by comparing descriptors stored in the memory and analogous descriptors, calculated on the fly by the receiver on the basis of the waveform received. It is also possible to provide for the waveform descriptors stored in the memory of the receiver to be simple descriptors, describing only elementary waveforms, a facility for predicting descriptors of complex waveforms being provided in the receiver so as to construct more complex descriptors on the basis of the simple descriptors of elementary waveforms and of simple descriptors of electromagnetic characteristics of materials; the two sets of simple descriptors are contained in the memory, and it is during the searches for resemblance that more complex descriptors are formulated in view of this search.

In addition to the method which has just been defined, the invention also proposes a system making it possible to implement the method. The system according to the invention is a wireless communications system comprising a network of several ultra-wideband emission/reception nodes (that is to say at least two nodes, but in practice at least three nodes, to actually constitute a network), including at least one node having an emission antenna capable of emitting impulse communication signals and a node having a reception antenna capable of receiving the signals thus emitted, the system comprising:
- a memory containing a series of descriptors of predicted signal waveforms, each descriptor corresponding to a signal waveform expected at the receiver for a determined interaction between the electromagnetic wave emitted by the emission antenna and surfaces potentially present in the environment which may affect the transmission of this wave in its path up to its reception by the receiver,
- digitization means for digitizing the waveform of a signal received and means for determining one or more temporal portions of the waveform of signal received which, because of their temporal distribution of energy, are apt to contain one of the predicted waveforms,
- comparison means for comparing between on the one hand a descriptor of the waveform extracted from the signal received for at least one of these temporal portions and on the other hand descriptors, from those contained in the memory, of several predicted waveforms,
- means for selecting at least one descriptor for which the comparison indicates a resemblance between the descriptor of the predicted waveform and the descriptor of the temporal portion of the signal received,
- and means for storing an item of information about the descriptor thus selected, representing an item of information regarding presence and position in the environment of a noteworthy object which causes an interaction corresponding to the interaction associated with the selected descriptor.

The system can comprise means for optionally eliminating one or more descriptors from among those which have been selected, because they give rise to geometric aberrations, that is to say impossible configurations. It can also comprise means for electing and storing one or more descriptors from among those which have been selected in the guise of estimated quartet of the variables AR, AE, material and angles of incidence. Also, the system can comprise means for processing the descriptors retained for each path detected, so as to deduce a configuration of the environment, that is to say an item of information regarding presence and position of one or more objects of noteworthy dimensions which cause an interaction corresponding to the interactions associated with the descriptors retained.

By way of example, a means for processing the descriptors retained can be an extended Kalman filter, by considering the observation of at least one of the variables AE, AR, material and angles of incidences of the paths detected as one or more functions of the "particular environmental configuration" state to be estimated. The observations can vary over time following the movement of one or more wireless communication nodes.

A waveform descriptor can correspond to representative characteristics (frequency characteristics, for example) for direction of emission (AE) and direction of reception (AR) pairs and for a material at a given incidence, instead of the entire digitized waveform. The memory can also contain descriptors of the electromagnetic characteristics of various materials (a priori deterministic) as well as certain probability distributions relating to the geometric constraints (a priori statistical).

The invention allows numerous applications. For example, a UWB wireless network of dangerous-gas sensors can calibrate the severity of an alarm as a function of the density of gas in the air (measured at each node) and transmitted by an ordinary communication through the network, but also as a function of the volume of the local environment, estimated by the environmental characterization function.

Or else, the same wireless sensor network, bolstered by the environmental characterization functionality, may trigger an alarm only when a threshold gas density (measured by a node) is exceeded and when an environmental modification (for example an intrusion) occurs (environmental characterization function) simultaneously.

Numerous other applications can be found in robotics, intrusion detection, environmental monitoring in dangerous surroundings, security, etc.

BRIEF DESCRIPTION OF THE DRAWINGS

Other characteristics and advantages of the invention will become apparent on reading the detailed description which follows and which is given with reference to the appended drawings in which.

DESCRIPTION OF PREFERRED EMBODIMENTS

To better elucidate one of the principles on which the present invention relies, possible interactions between a UWB electromagnetic wave and a wall, and examples of waveforms which may result therefrom in the receiver, have been represented in a schematic manner in FIGS. 1 to 5.

Figure 1:
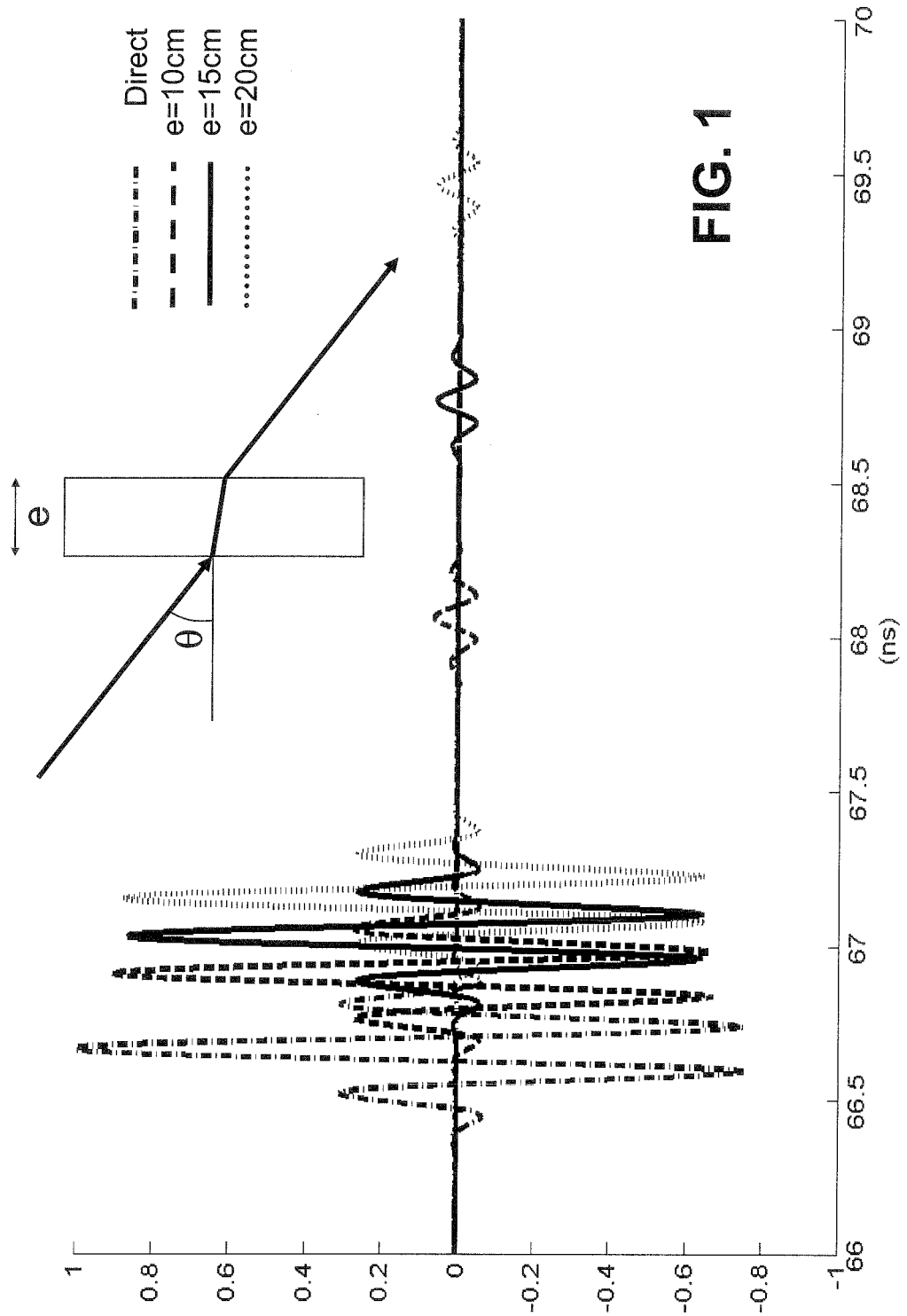
FIG. 1 represents a form of signal received after transmission of a UWB impulse electromagnetic wave through a wall, as a function of the thickness of the latter.

In FIG. 1, an emitter sends toward the wall, at an incidence $\theta$, a pulse having the form of a sinusoid multiplied by a Gaussian function. The choice of this pulse is arbitrary and does not alter the general character of the observed phenomena. The receiver is placed on the other side of the wall so as to receive the wave which has passed through the wall. The corresponding waveforms and notably the propagation delays depend essentially on the thickness e of the wall. Superimposed in FIG. 1 are the waveform obtained in a direct path (absence of wall or zero wall thickness) and the waveforms obtained for a wall thickness of 10 centimeters, 15 centimeters, and 20 centimeters respectively, in the case of a material whose dielectric characteristics are the following: relative permittivity equal to 3 and conductivity equal to 0.0012 $ohm^{-1} \cdot m^{-1}$, and for an angle $\theta = 0°$.

It is seen that the pulses received are different in these four cases. The direction of incidence has not been varied but it would be possible to verify that the waveform received depends also on the incidence. According to the internal structure of the wall, there will be greater or lesser deformations and delays, which are due to internal reflections in the wall which are superimposed on the main wave.

Figure 2:
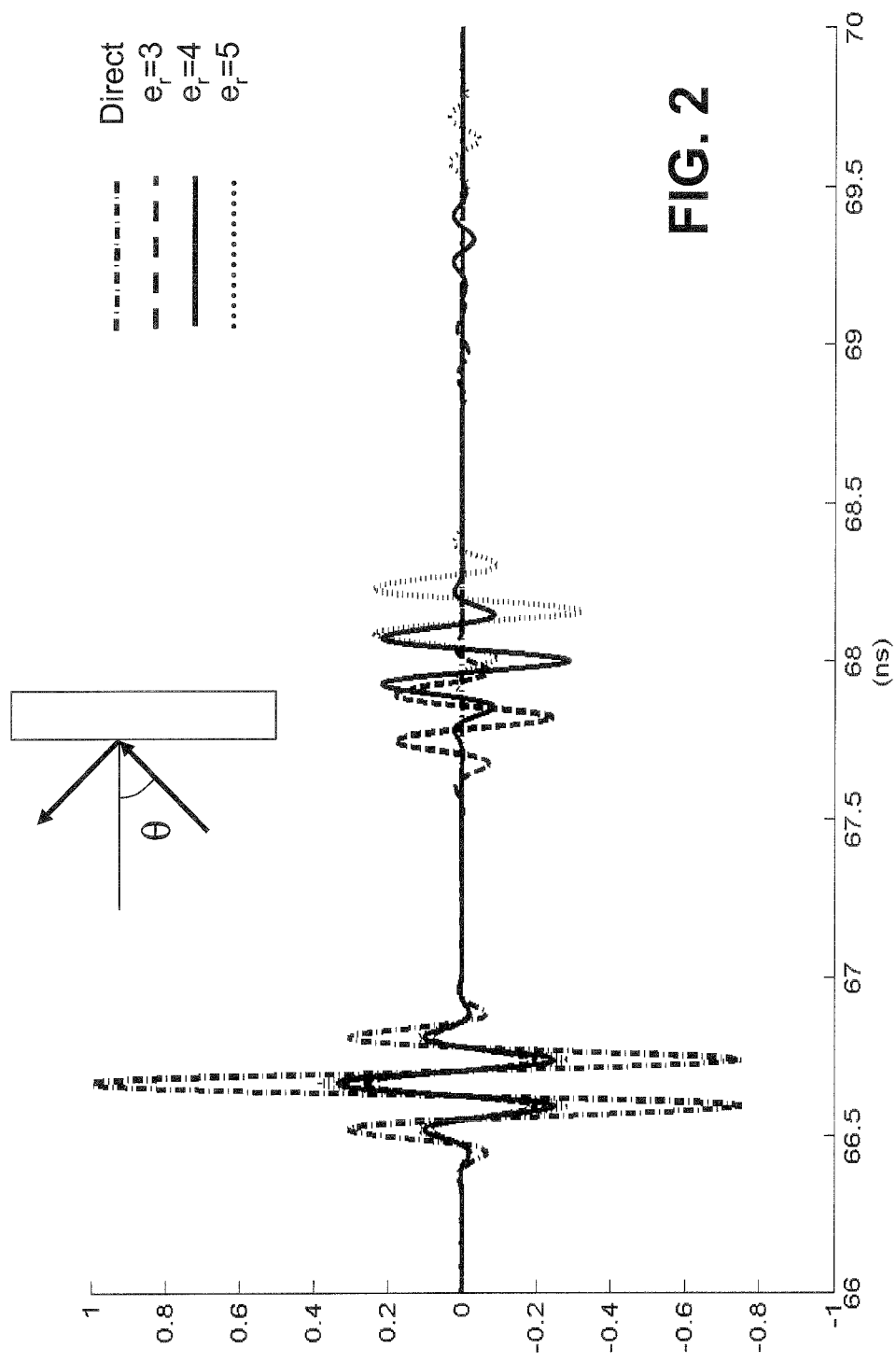
FIG. 2 represents a form of signal received after transmission of a UWB impulse electromagnetic wave reflected by a wall, as a function of the relative permittivity of the material constituting the wall.

In FIG. 2, an emitter sends the same pulse as in FIG. 1, and the receiver receives the pulse after reflection on a wall, at an incidence $\theta$. The wall has a conductivity of 0.0012 $ohm^{-1} \cdot m^{-1}$ and a thickness of 10 cm. Several waveforms have been superimposed in FIG. 2 and they correspond to various values of permittivity $\in_r$ of the material making up the wall. Represented fictitiously is the waveform which would correspond to a direct path with no obstacle, of the same length as the reflected path, the emission and reception antennas being oriented so as to emit and receive the waves at the same incidences as in the case of the reflected paths. The reflected waveforms which are represented correspond respectively to materials of relative real permittivity of 3, 4 and 5 respectively, for an angle $\theta = 0°$. The delay increases with permittivity.

Figure 3:
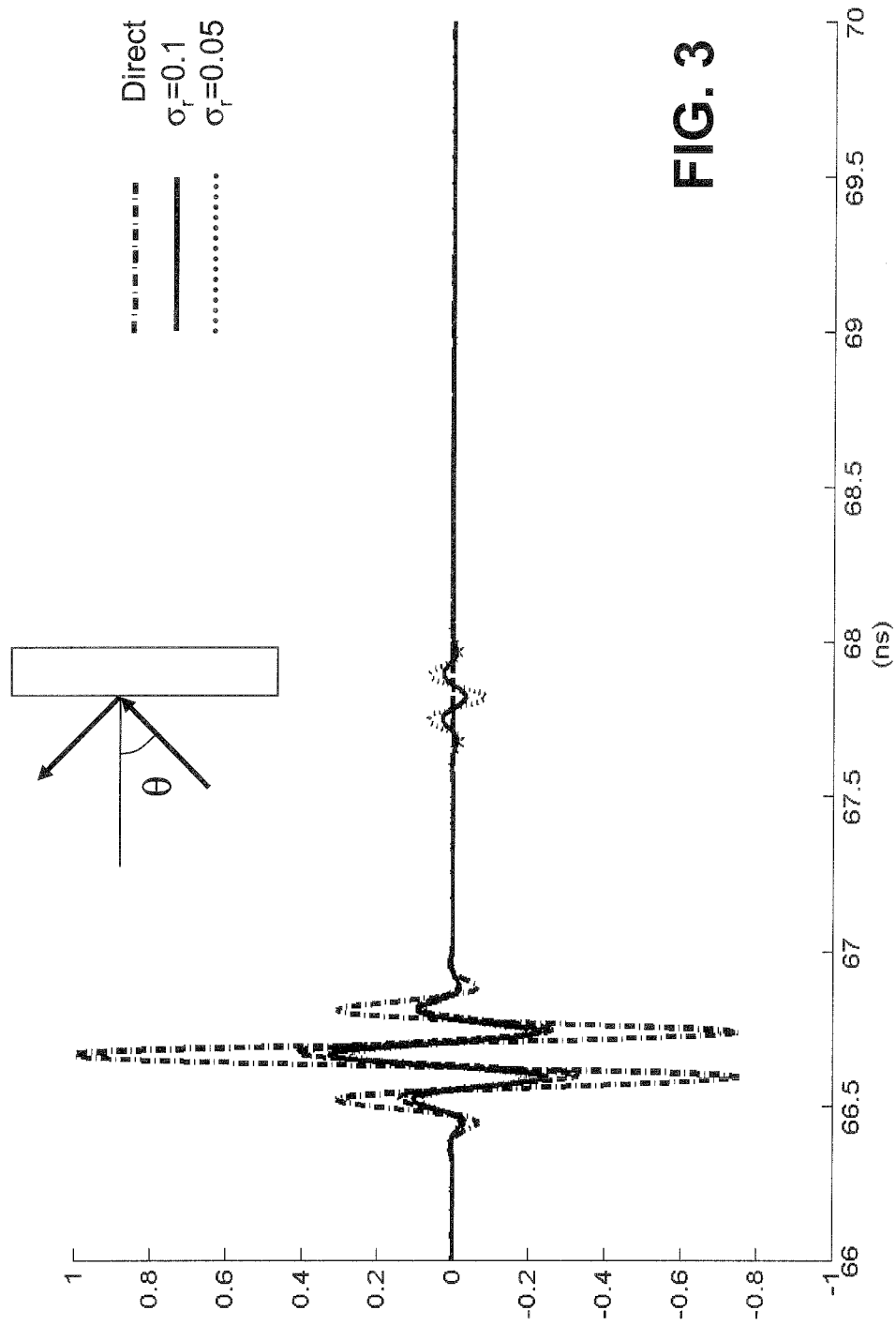
FIG. 3 represents a form of signal received after transmission of a UWB impulse electromagnetic wave reflected by a wall, as a function of the electrical conductivity of the material constituting the wall.

FIG. 3 is still dealing with the case of a reflection on a wall at an incidence $\theta$ (in the two-dimensional case), and two waveforms are represented (in addition to the fictitious direct path described above), corresponding to two different electrical conductivities of the material constituting the wall, in the case where the thickness of the wall is 10 centimeters, the relative real permittivity is 3 and the respective conductivities are 0.1 and 0.05 $ohm^{-1} \cdot m^{-1}$, the angle $\theta = 0°$ in the two-dimensional plane.

Figure 4:
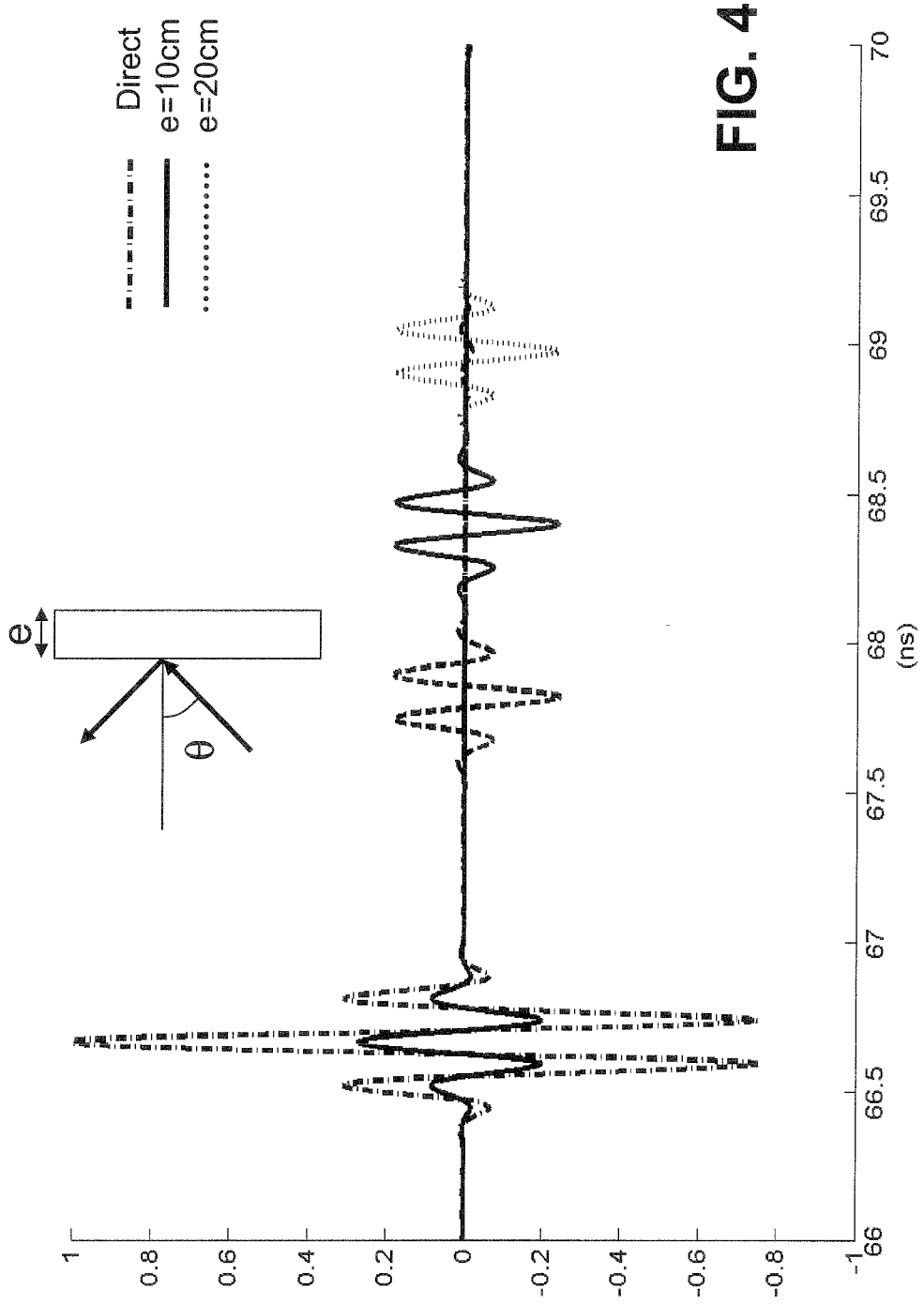
FIG. 4 represents the signal received after transmission of a UWB impulse electromagnetic wave reflected by a wall, as a function of the thickness of the wall.

In FIG. 4, the wave reflected by the wall at an incidence $\theta$ (in the two-dimensional case) is more or less deformed and delayed as a function of the thickness e of the wall and two waveforms are represented (in addition to the wave corresponding to the fictitious direct path) corresponding respectively to a thickness of 10 centimeters and a thickness of 20 centimeters, for an angle $\theta = 0°$ in the two-dimensional plane. The electrical conductivity is 0.0012 $ohm^{-1} \, m^{-1}$ and the relative real permittivity is equal to 3.

It is also possible to consider the case of an electromagnetic wave which undergoes a diffraction interaction on the sharp edge of an obstacle. The signal is backscattered in all directions in space but nevertheless with favored directions of propagation (in particular along two optical boundaries delimited by the reflected and incident rays), and with significant distortion. In the other directions, it is possible to consider that the attenuation is too high to give rise to a directly utilizable signal. Here again, the waveform is modified by the interaction of the wave with the edge.

In the previous FIGS. 1 to 4, no account has been taken of the signal deformation due to the antennas themselves: emission antenna and reception antenna. They merely compare a waveform deformed by a wall in transmission or in reflection, by comparing it with the waveform in the absence of any wall but with the same angle of emission (in relation to the emission antenna) and the same angle of reflection (in relation to the reception antenna), doing so for antennas which are ideally non-deforming.

However, generally, the deformation due to the direction along which the emission is considered and to the direction along which the reception is considered is very significant because of the non-uniformity of the radiation patterns of the antennas, even when they are considered to be quasi-omnidirectional in terms of power. The CMA antenna (for Conical Monocone Antenna) may be cited by way of example.

Figure 5:
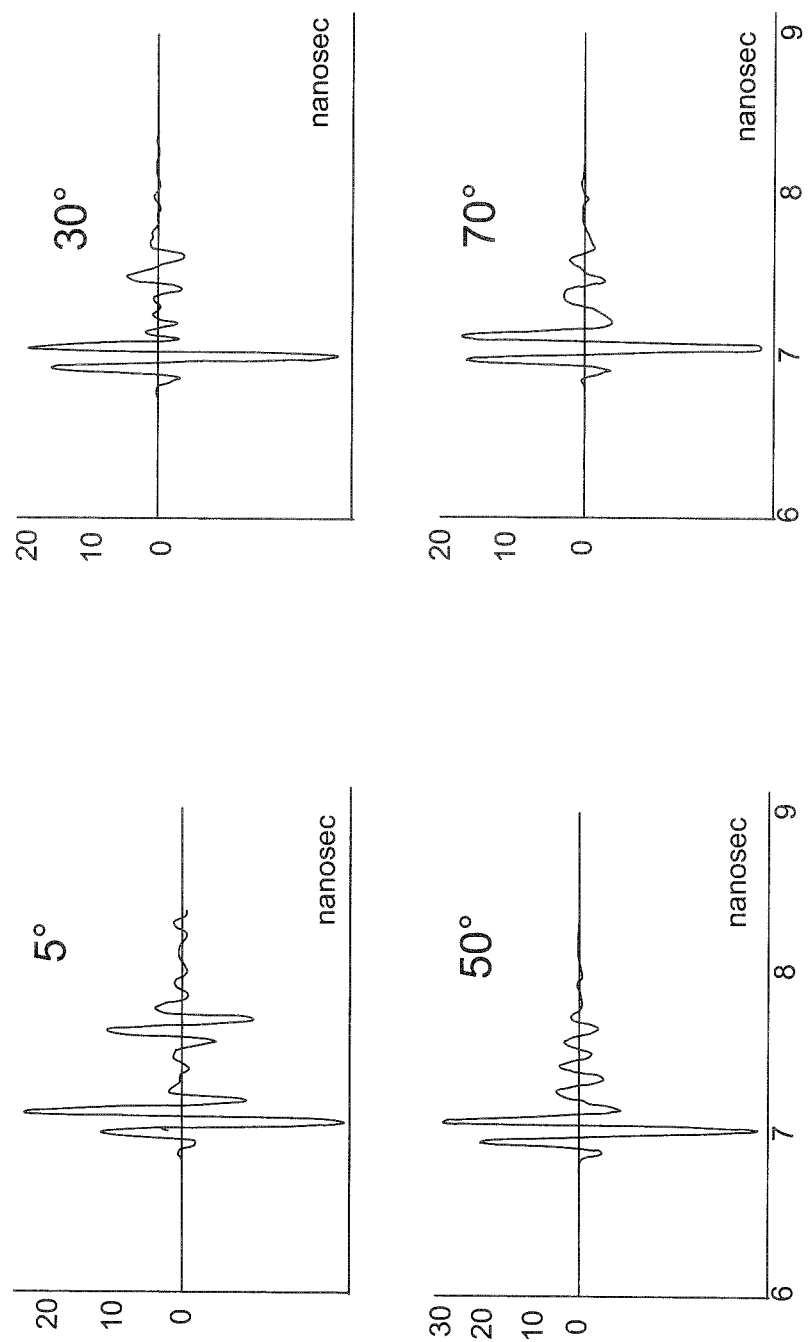
FIG. 5 represents the impulse signal received as a function of an angle of incidence of the wave on the receiver.

FIG. 5 illustrates, by way of example only, waveforms received at various angles of incidence by one and the same antenna model and for one and the same emitted pulse. The angles are respectively 5°, 30°, 50° and 70° in the azimuthal plane, with respect to a characteristic axis of the antenna; the characteristic axis can be an axis of symmetry if the antenna is symmetric (butterfly form antenna for example). These figures are given to show possible deformations as a function of the direction of radiation and of reception of a UWB antenna, but these deformations depend on the type of antenna. In a multi-node communication network designed for the communication of information but not for the characterization of the environment, it will be necessary to take account of the characteristics of the antennas such as they are, that is to say not optimized for environmental characterization.

All the waveforms which are represented in the figures are merely simple examples showing that it is possible to observe different deformations when there is a different interaction between the wave and an obstacle.

According to the invention, waveforms will be associated with various possible interactions so as to be able thereafter to detect one of these forms, or a sufficiently similar form, in a signal received and to conclude therefrom that it is probable that the impulse wave has undergone this or that an interaction associated with this form.

Given that the deformation is particularly sensitive as a function of the direction of emission and of the direction of reception, waveforms will be associated with several possible directions for one and the same category of interactions. As the deformation also depends on other parameters, such as thickness, conductivity, permittivity, a possible strategy consists in storing waveforms each corresponding to an interaction which can be defined for a wall material (brick, concrete, wood, glass, etc.) rather than for a combination of a permittivity and a conductivity. As a supplement to this information, the algorithm has descriptors of probability distributions relating to the geometric characteristics. According to a compromise between real-time calculation complexity and allocated memory, it is possible to store a larger or smaller number of predicted forms in a memory associated with the receiver. The prediction of the non-stored waveforms is ensured by a facility for prediction on the fly.

Thus, the invention rests on the ability to predict waveforms received by relying on the descriptors contained in a memory associated with a UWB radio signal receiver. In a simple implementation of the algorithm, these descriptors can be realized in a table associating various waveforms and predefined interactions which give rise to these waveforms. The memory can be contained in the receiver itself, but it will be understood that it can also be contained in a signals calculation or processing facility which is associated with the receiver but not contained in the receiver. In this case, the receiver can store waveforms received while waiting to transfer these waveforms to a calculation or processing facility.

The receiver can be mobile so as to be able to be moved in its environment with a view to exploring the environment and it is then desirable for it to be of small size. There are, however, cases where the receiver may be fixed: for example in the case where it must serve to detect mainly modifications of the environment (entry of individuals, opening of doors or windows, movement of partitions or obstacles, etc.).

If a receiver is placed in a real indoor environment (an office, an apartment room, etc.) and if a pulse is emitted from an emitter placed in this environment, the receiver will receive a composite signal mixing waveforms arising from several simultaneous paths of the wave.

Figure 6:
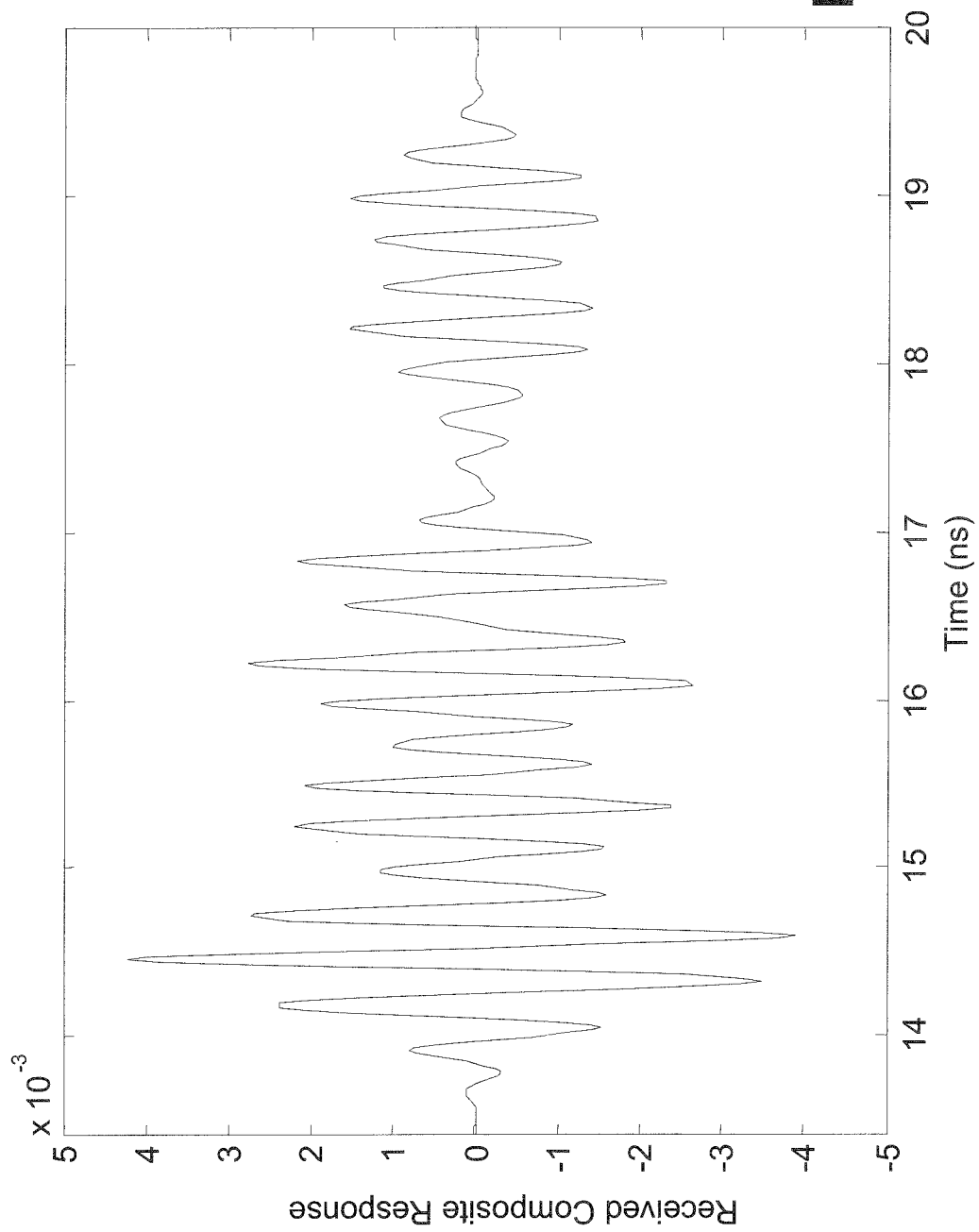
FIG. 6 represents a composite waveform received in the case where a UWB pulse has undergone multiple paths before arriving at the receiver.

FIG. 6 represents by way of example a composite signal received on a reception antenna, which signal results from this mixing of electromagnetic waves received by the receiver after the emission of a single pulse; in this example, the signal received originates from a direct path originating from the emitter but also from several paths reflected respectively by the ground, by the ceiling and by a wall of the room in which the receiver is situated.

The signal received in practice by a receiver is therefore more complex than those that were described with reference to FIGS. 1 to 5. However, it is considered that it is possible to retrieve in this composite signal several components each corresponding to one of the possible paths of the wave.

Indeed, looking at the signal of FIG. 6, amplitude spikes are seen which make it possible to individually tag the existence of each of the paths. These spikes are at different positions from one another when they correspond to different lengths of paths traveled by the electromagnetic wave.

Figure 7:
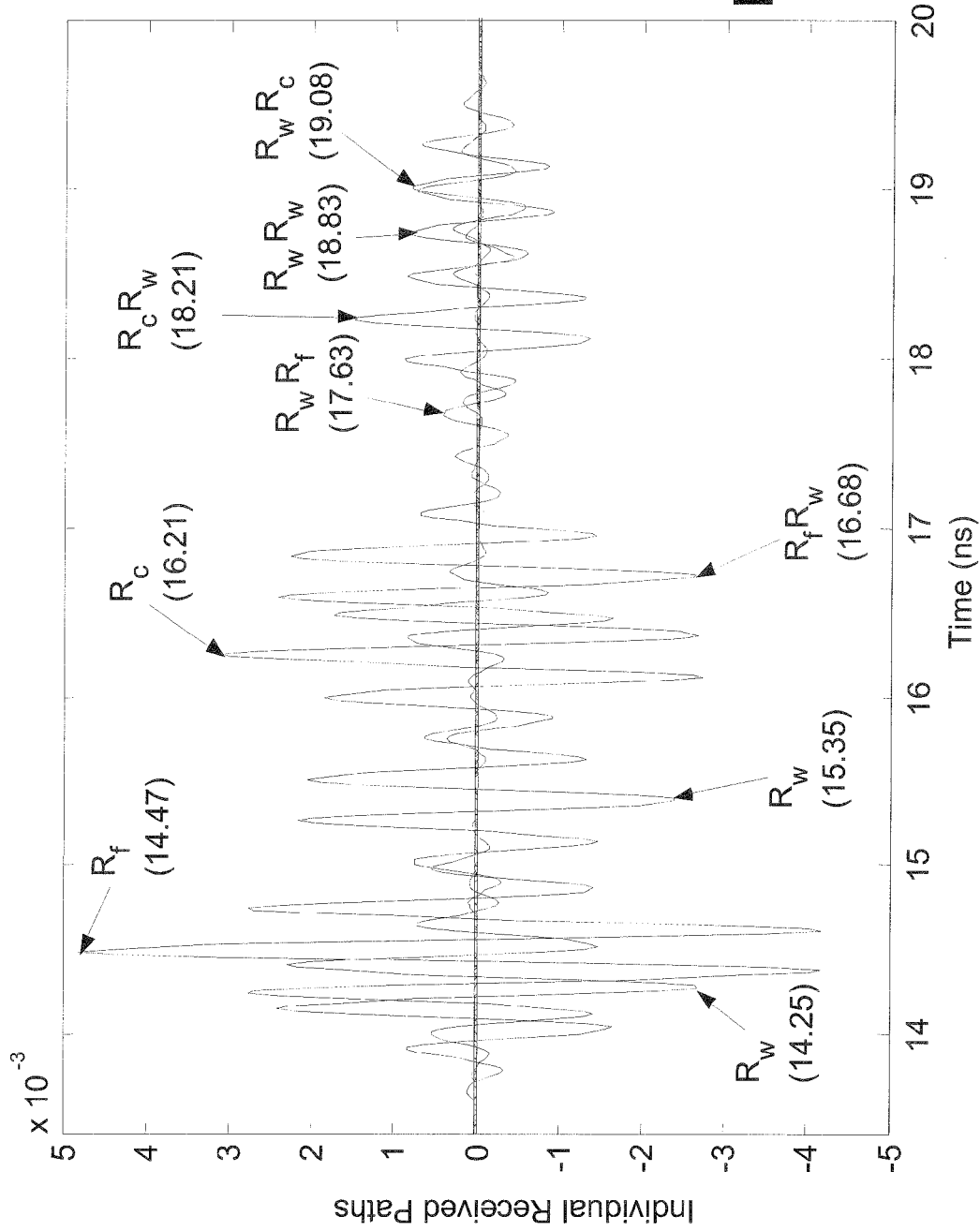
FIG. 7 represents the decomposition of the waveform of FIG. 6 to better show the influence of each of the paths.

In reality, the composite signal of FIG. 6 is nothing other than a superposition of several pulses (each in the form of a sinusoid multiplied by a Gaussian deformed by the corresponding interaction) corresponding to various paths and this has been illustrated in FIG. 7 by representing various individualized signals which correspond to possible paths of the impulse wave emitted. It has been assumed that there was no direct path on the portion represented but only:

a path reflected on a wall (signal Rw)
a path reflected on the ground (signal Rf),
a path reflected on another wall (signal Rw)
a path reflected on the ceiling (signal Rc),
numerous paths arising from double reflections.

It is the combination of these various signals which produces the composite signal that the receiver will observe and process.

According to the invention, it will be sought to recognize in the composite signal provided by the receiver one or more of the forms characteristic of interactions prerecorded in the memory or predicted on the fly by means of other descriptors contained in the memory. A comparison of the descriptor of the waveform received and of the descriptors of the predicted waveforms is therefore performed. This comparison can be implemented by a search for maximum values of inter-correlation between a portion of the digitized signal received and numerical waveforms predicted in the time domain. In this strategy, a particularly high correlation value for a particular predicted form, that is to say a high resemblance between the signal received and this particular form, will be the sign of the probable presence of a known interaction (in the broad sense, that is to say comprising the directions of emission and reception) and corresponding to this particular form. Other comparison means can be employed, such as for example non-linear estimation tools such as neural networks. In a more general manner, it is possible to envisage comparisons between the descriptors of predicted waveforms and descriptors of the signal received, calculated on reception.

This search begins by identifying temporal portions or "windows" in which the energy distribution of the signal seems to make it possible to isolate a pulse. The energy spikes will generally be easy to identify and will make it possible to define limited temporal portions around the instant of arrival of this spike, with a high probability that these portions correspond to the arrival of a pulse.

Figure 8:
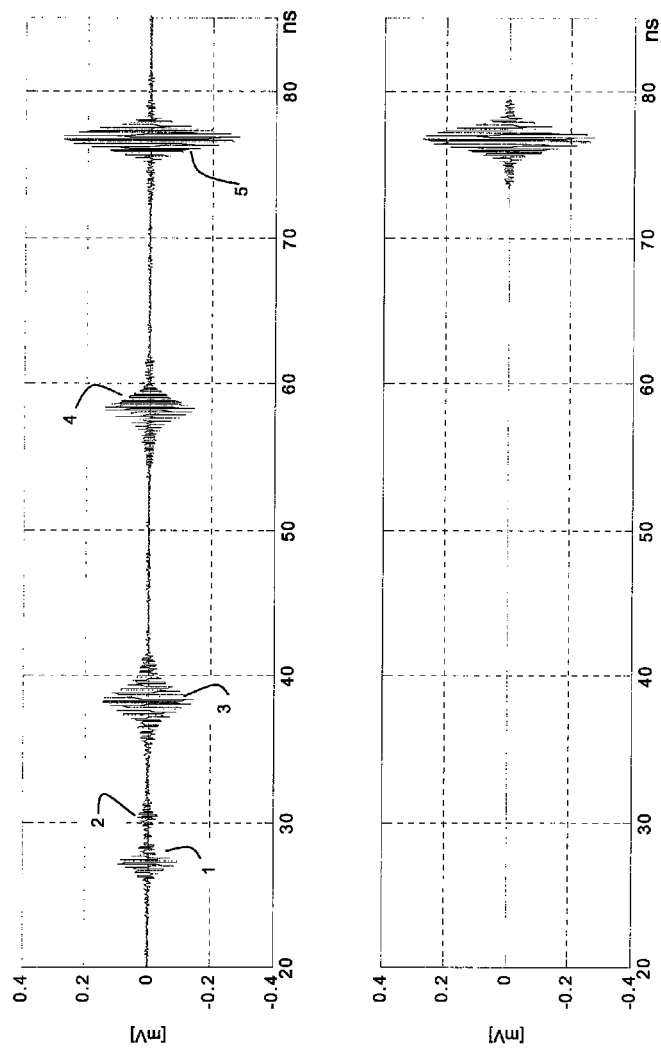
FIG. 8 represents on the one hand a composite signal received in a two-dimensional test configuration, clearly revealing successive pulses received after multiple paths, and on the other hand a predicted single impulse form corresponding to an interaction identified on one of the paths.

In FIG. 8 has been represented (upper part of the figure) a signal (amplitude in millivolts along the ordinate, time in nanoseconds along the abscissa) obtained in a test configuration, in which the temporal portions indicative of the signal are well isolated from one another and are numbered from 1 to 5, thereby making it possible to understand the process better. In fact, this particular configuration does not impact the general character of the method: simulation results demonstrate that, even in a less favorable case, that is to say in the presence of paths that are less isolated, within the framework of the strategy using correlation as a comparison tool, correlation spikes would nevertheless be identified, and consequently an estimation can take place in all cases. The description which follows by way of example will consider the use of inter-correlation in the guise of comparison tool and the use of waveforms digitized in the time domain in the guise of waveform descriptors.

Work will preferably begin with the signal zones exhibiting the highest energy levels since they carry more information, or in all cases the information that they contain is easier to determine.

Thus, if a temporal portion referenced 5 situated between 72 and 80 nanoseconds and having the highest signal level is isolated, a correlation is performed between the waveform situated in this interval and a series of waveforms contained in memory (normalized in terms of energy in this example so as to make the comparison solely with regard to the temporal shape of the signals and not on their levels).

The maximum inter-correlation value is calculated for each of the predicted waveforms and a set of waveforms corresponding to the highest values from among the inter-correlation maxima is chosen. Consequently, a set of possible angular variables is associated with the wave propagation path undergoing correlation analysis. The correlation calculation will be returned to further on, with illustrations in support of the explanations.

It is possible to redo the same operation on several time windows corresponding to the various identifiable pulses 4 to 1.

It is also possible to profit from the recognition done for a first pulse so as to eliminate this pulse from the signal received before redoing an analysis on another pulse. This is particularly useful if the pulses tend to overlap. In this case, with the prerecorded form recognized in the first pulse 5, a fictitious signal is constructed which corresponds to this form and which is tailored in terms of time and amplitude level to the signal part referenced 5 which gave rise to this maximum inter-correlation search; this fictitious signal is represented in the lower part of FIG. 8. Next, the fictitious signal is subtracted from the signal received, and a similar treatment is carried out for each configuration (that is to say for each group or quartet of four angular variables) in parallel. The operation amounts to constructing an estimation tree for the angular variables, each branch of which corresponds to a retained configuration. Thereafter, a search for a maximum between the inter-correlation maxima on other temporal portions is recommenced, preferably in the order of decreasing signal levels; a new waveform exhibiting the highest value of inter-correlation with this portion is found, it is reconstructed and it is subtracted from the signal; so on and so forth by successive iterations until several probable interactions have been identified. At each iteration (that is to say for each wave path processed), the estimation tree grows in depth, until it reaches a maximum depth equal to the number of time windows considered, or, equivalently, to the number of paths termed "resolved", that is to say identified subsequent to the analysis.

Figure 10:
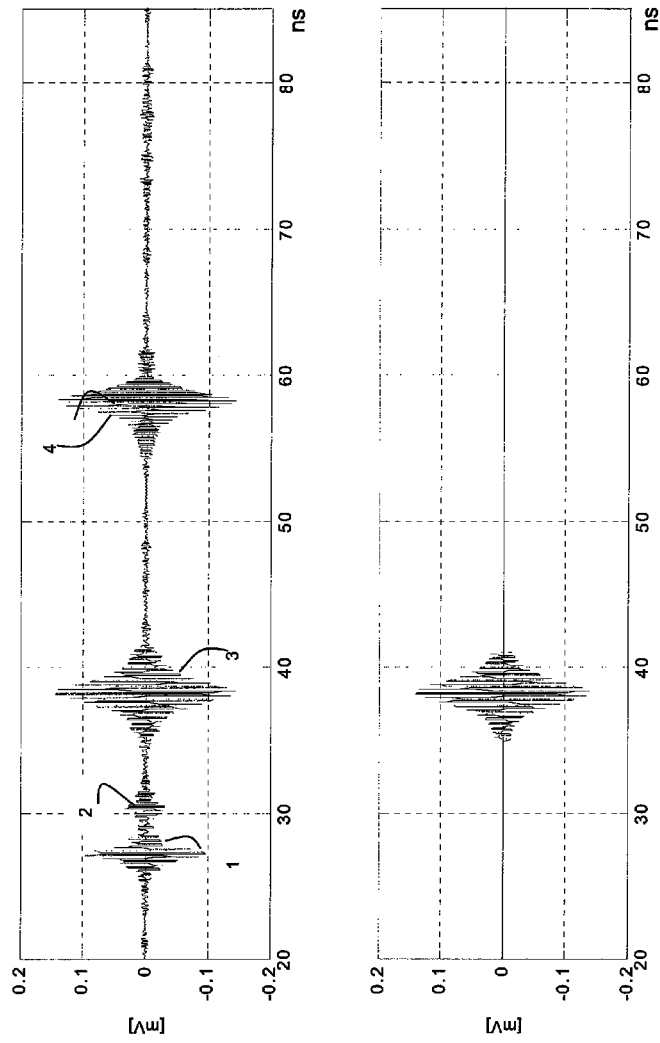
FIG. 10 represents on the one hand a composite signal resulting from the subtraction of the composite signal of FIG. 8 and of the predicted impulse form, and on the other hand a new predicted impulse form corresponding to an interaction identified on another path.

FIG. 10 represents in its upper part the signal that formed the subject of the first subtraction (scale expanded with respect to FIG. 8) and in its lower part the fictitious signal reconstructed after having found a maximum correlation between the temporal signal portion referenced 3 and the waveforms stored in memory.

The correlation search will in principle be done on digitized signals, both as regards the signal received by the receiver and the predicted waveforms stored. However, the storage of the predicted waveforms is not necessarily done by storing a numerical succession of amplitude values sampled at a determined time interval. It is very possible to envisage other storage solutions, and in particular storage of a representation of the waveform in frequency space. In this case a Fourier transform of the waveform received can be done after identifying a relevant temporal portion. A comparison of the waveforms can then be made in frequency space (for example, in the least squares sense). A temporal signal is thereafter reconstructed with a view to a subtraction between the signal received and a reconstructed signal.

Because the storage of predicted waveforms can be done in various forms, in this patent application the expression "waveform descriptor" has been used for the data placed in memory for each predicted interaction, this term covering any of the following a direct description of the waveform by a set of numerical values of successive samples over a given time period,
  or an indirect description, in the form of a set of complex values (for example comprising the modulus and the phase) for a succession of frequencies in a determined frequency band,
  or any other direct or indirect description of the waveform, a series of descriptive parameters possibly being recorded to describe a waveform.

The maximum correlation search is done by calculating values of inter-correlation between the signal received and the predicted waveforms. For example, if the correlation search is done in the time domain, one proceeds as follows:

the calculation of a digital version of the inter-correlation function $C_i(\tau) = \int Sp_i(t) Sr(t-\tau) dt$ is performed on the basis of the digitized versions of the windowed signal received $Sr(t)$ (portion corresponding to the isolated current path to be estimated) and of a predicted waveform $Sp_i(t)$ from among the various predicted forms each corresponding (for example) to a type of interaction and a pair of directions of emission/reception $AE_i/AR_i$; t is the time variable; $\tau$ is a time-slip value, and the inter-correlation value $C_i(\tau)$ for a given slip $\tau$ is the temporal integral, over the time variable t, of the products of all the samples $Sp_i(t)$ of a predicted waveform times a corresponding sample $Sr(t-\tau)$, shifted by the slip $\tau$, of the signal received $Sr(t)$; the inter-correlation value is calculated for a set of slip values $\tau$;

the maximum value $C_i(\tau_{xi})$ of this inter-correlation function is sampled, as is the temporal shift $\tau_{xi}$ which gave rise to this same value;

the operation is repeated on the set or on a subset of the k waveforms that it is possible to predict;

the maximum value $C_m(\tau_{xm})$ is then advantageously searched for from among the inter-correlation maxima $C_1(\tau_{x1}), \ldots C_k(\tau_{xk})$ associated with each predicted waveform $Sp_1(t), \ldots, Sp_k(t)$, or else a suite of N inter-correlation values (for example, the N largest values);

at least the waveform $Sp_m(t)$ which gave rise to the maximum $C_m(\tau_{xm})$, or a suite of N waveforms, from among the k possible waveforms, is associated with the estimated current path;

on the basis of the information $C_m(\tau_{xm})$ and $\tau_{xm}$ and of the selected waveform (or of the corresponding information for the suite of N waveforms), a digitized replica (or N digitized replicas) of the signal received, and windowed, is preferably reconstructed, this replica being correctly positioned in time and dimensioned in amplitude;

the replica is subtracted from the digitized version of the signal received (in its entirety), and all the previous operations are repeated for the estimation of the following paths on the basis of the signal received thus cleaned. On the basis of the suite of N replicas, the following paths will be estimated on the basis of N versions of the received signal cleaned, each constituting a branch of the estimation tree.

In a simple implementation of the algorithm, in which N is fixed at 1, the waveform which gave rise to the selected maximum is associated with an interaction undergone by the impulse wave and with a pair of angular emission/reception values. In the case of a simple reflection, this gives the relative position and the orientation of a reflecting wall with respect to the emitter and receiver positions. The position of the reflecting point is situated at the intersection of a straight line passing through the emission antenna and directed along the direction of emission corresponding to the selected descriptor and of a straight line passing through the reception antenna and directed along the direction of reception corresponding to the selected descriptor; the orientation of the wall is that of a plane perpendicular to the bisector of these two straight lines.

Given that the method normally includes the determination of a temporal portion in which each path received is situated, it is possible to determine, on the basis of the estimated delay value for the first path received and of the estimations of the delays of the following paths, an additional indication making it possible, for example, to refine the estimation of the wall positions which have been determined at the intersections of the emission and reception straight lines. Indeed, the person skilled in the art will readily understand that it is possible to determine, for each identified path, the flight time of the signals (TOF for Time of Flight) and therefore the distance traveled by these same signals, on the basis of the estimated delays (TOA for Time of Arrival). This additional step provides for example for the implementation of a suitable protocol allowing the estimation of the outward-return flight time of the signals (Round Trip Time of Flight) on the basis of the cooperative exchange of packets between the two radio nodes considered (Two-way Ranging).

Figure 12:
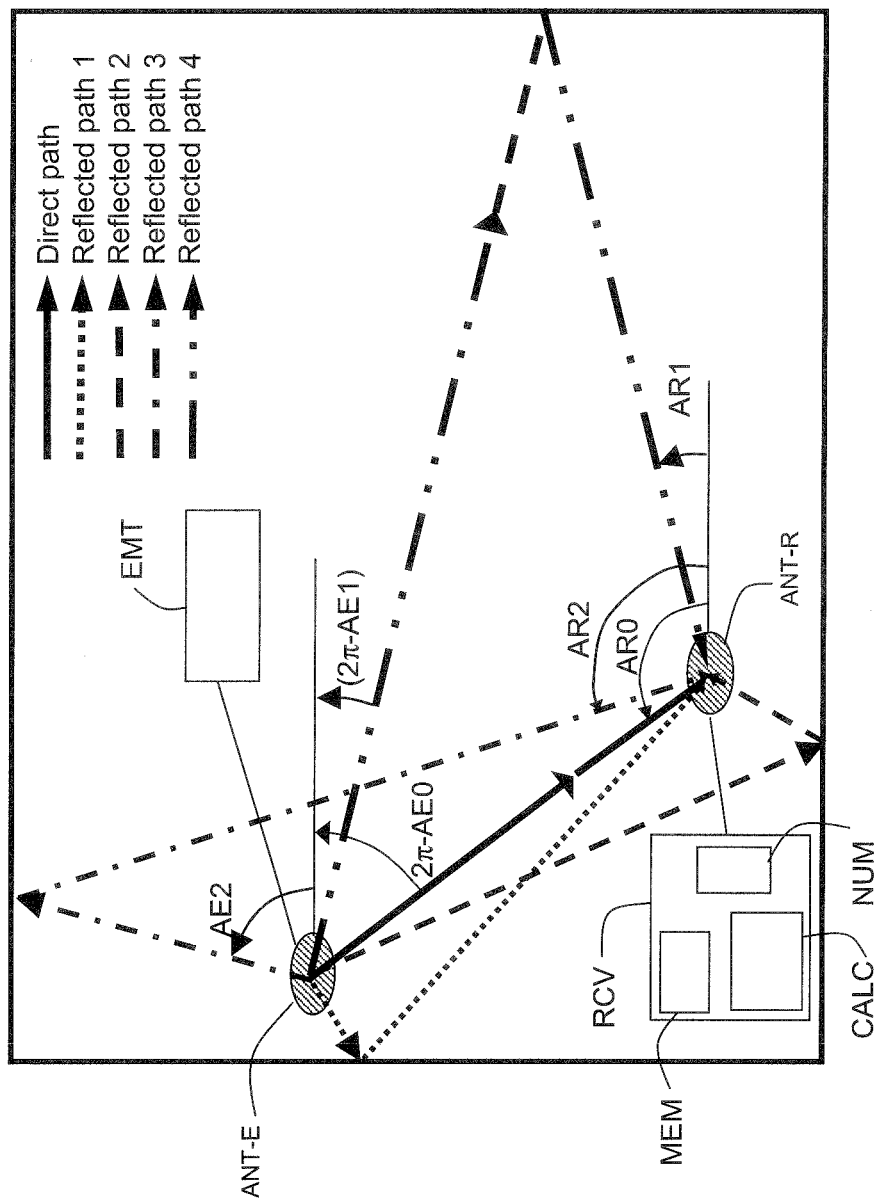
FIG. 12 represents the system for aiding environmental characterization according to the invention, placed in a room with four walls.

The following results were obtained for the geometric configuration of FIG. 12 and for an antenna of cardioid type such as described in the publication by X. Liang and Y. Y. M. Chia "New decision wideband direction finding antenna", in IEEE proceedings on Microwave Antennas Propagation, vol 148 N° 6, December 2001, and Gaussian additive noise filtered in the band of the signal [2.8-6.2 GHz].

Figure 9:
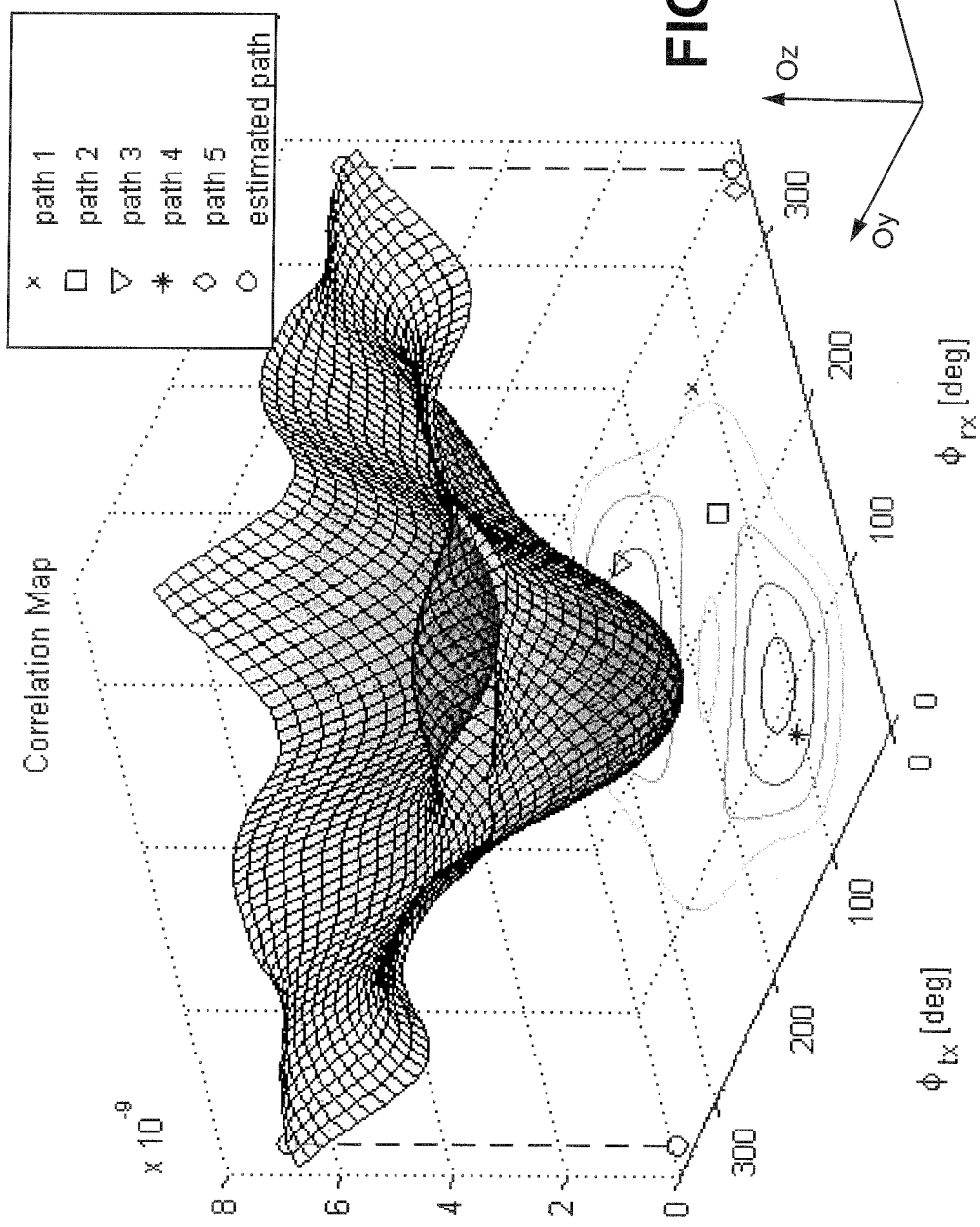
FIG. 9 represents a chart of maximum inter-correlation values as a function of an angle of emission and of an angle of reception, with a view to the identification of a path corresponding to one of the pulses isolatable from the composite signal of FIG. 8.

By way of illustration of the inter-correlation calculation results, a chart, in three dimensions, of the inter-correlation maxima which result from the inter-correlation calculations for the temporal portion 5 of the signal received represented in FIG. 8, has been represented in FIG. 9. This chart is derived from simulations and tests performed and is given only by way of example. The inter-correlation is calculated as a function of two parameters which are an angle of reception $\Phi rx$ (graduation in degrees along an axis Ox) and an angle of emission $\Phi tx$ (graduation in degrees along an axis Oy). A correlation level is given along a third axis Oz, in arbitrary units. The inter-correlation maxima are calculated for a series of combinations of a value of emission angle and of a value of reception angle and are plotted on the chart.

The map of the inter-correlation maxima (labeled "correlation map") of FIG. 9 makes it possible to determine maxima of inter-correlation maxima (at least one maximum but possibly several) between the received signal windowed (here the window defines the temporal portion 5 of the signal), and the reference signals of the database, as a function of the angles of emission and reception. This is a first iteration, the following iterations will pertain to other windows.

The points corresponding to five possible real paths in a configuration which has served for the test and for which the signal received was that of FIG. 8 have been plotted in the plane Ox, Oy of the chart. The five paths are represented by respective marks (labeled respectively in the legend as "path1", "path2", "path3", "path4", "path5"); these marks are respectively a cross, a square, a triangle, a star, and a lozenge; they are placed at positions corresponding to the characteristic angles of emission and reception previously logged in the test configuration for various possible paths of the pulses emitted, with or without reflection. For example, the first temporal portion, which corresponds to a cross mark, is a position at 100° on emission and 80° on reception; the second corresponds to a square mark, with position at 125° on emission and at 225° on reception, etc.

Also represented, subsequent to the inter-correlation calculations, are two additional marks which are two round marks (labeled "estimated path" in the legend) which have been placed in the plane Ox Oy just where the maxima (according to Oz) of the inter-correlation maxima function obtained are situated; these marks therefore represent paths estimated by virtue of this inter-correlation calculation. It is noted that these two round marks correspond to angles close to 360° on emission and to zero on reception or the converse. It is therefore probable that a pulse path corresponding to these angles exists in the test configuration. This is precisely what may be noted since it is seen that one of the round marks is very close to a lozenge mark.

The inter-correlation calculations performed in this case have therefore made it possible to verify that the temporal portion 5 (subject of this calculation) does indeed correspond to one of the previously identified possible paths, namely the first path "path1" which corresponds to an angle of emission of about 0° and an angle of reception of about 360°. The ambiguity noted (there are indeed two round marks in the chart) is due to the reciprocity principle of electromagnetic paths. Most of the time this ambiguity can be readily removed a posteriori, for example on the basis of simple geometric considerations (for example one of the two pairs gives rise to a configuration which is impossible for a simple reflection having regard to the angular reference of the antennas.

Figure 11:
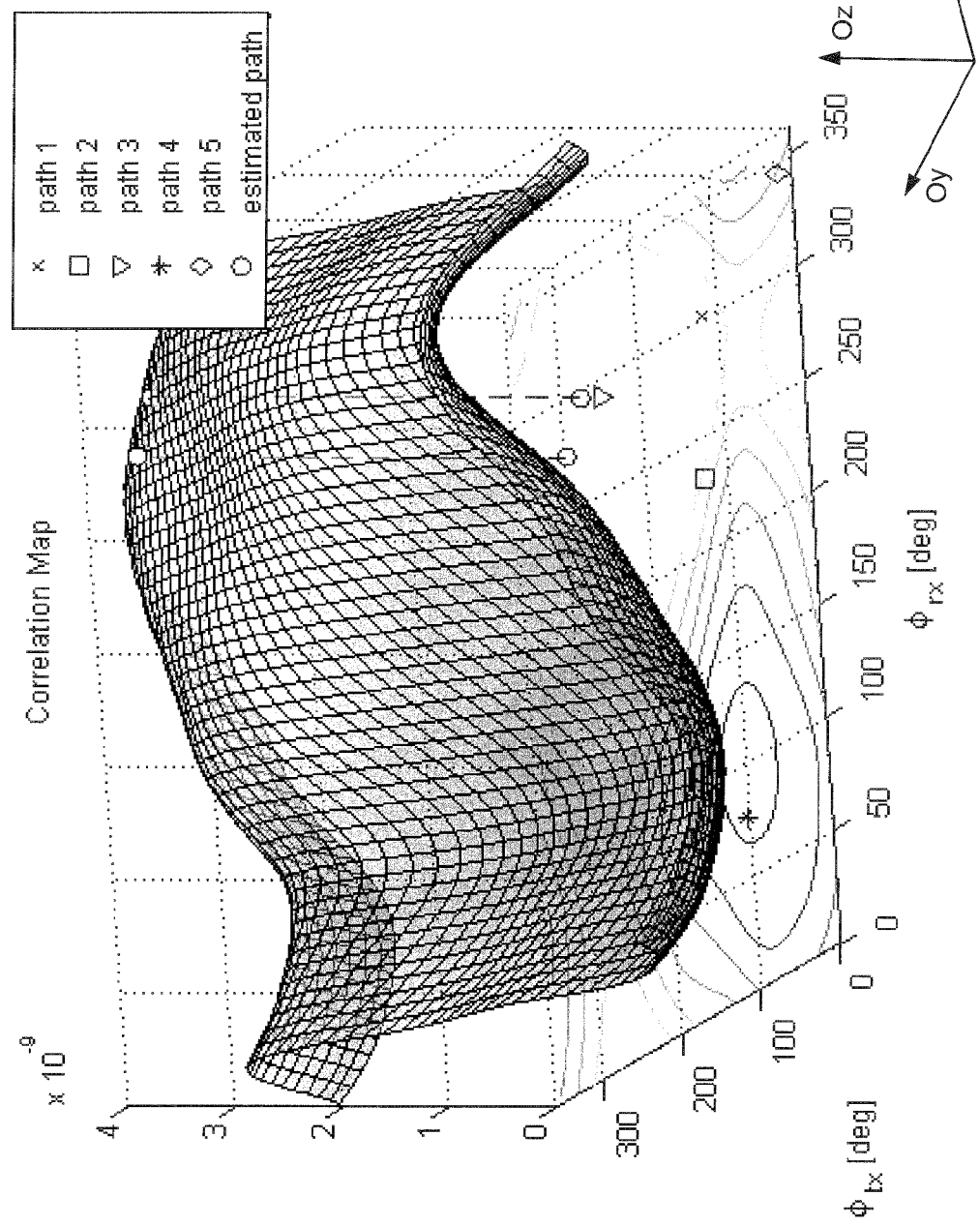
FIG. 11 represents a chart of maximum inter-correlation values as a function of an angle of emission and of an angle of reception, with a view to the identification of a path corresponding to a pulse isolatable from the composite signal of FIG. 10, that is to say after a subtraction.

If a subtraction of the first waveform identified as being the most similar to the temporal portion 5 is performed as explained previously, this culminates in a new waveform of global signal received, represented at the top of FIG. 10; a second iteration step then consists in selecting a new useful temporal portion, here the portion 3 and in redoing inter-correlation calculations. FIG. 11 represents a new correlation map obtained. The paths identified beforehand in the test are of course at the same positions in the chart, but it is noted that the inter-correlation maxima obtained this time (round marks in the plane Ox, Oy of the chart) are now at a pair of angles 240°, 290°, thereby defining a different path from the previous one. It is noted that one of the round marks is very close to a triangular mark, corresponding to the label "path3". The inter-correlation calculation for the temporal portion 3 therefore leads, here again, to the conclusion that this pulse has indeed followed one of the paths previously identified in the test, namely the third path "path3".

The digitization of waveforms of signal received is preferably performed for a series of pulses emitted successively by the emission antenna at determined time intervals. It is then possible to gather waveforms for each of the emitted pulses and carry out a coherent integration of the signals by adding together the signals with an appropriate temporal shift so as to increase the signal-to-noise ratio available for the analysis of each path. If the pulses are all identical, that is to say if the channel is considered to be stationary and the relative drift of the clocks between the emitter and the receiver to be small (or compensated for by a physical device and/or by appropriate processing) during the coherent integration process, the signal-to-noise ratio is increased and the determination of a not very noisy waveform which will serve in the correlation operations is therefore facilitated.

Since the emitter node and the receiver node form part of a UWB communication network, the series of pulses is preferably a series emitted during a communication message sent over the network by the emission antenna, for example during the header of a message, so as to perform an environmental characterization during the current use of the communication network. Such a characterization during the communication can turn out to be particularly useful for several applications. A first application consists, for example, in using the environmental characterization in order to adapt the receiver (or the emitter) as a function of the environmental variations. The adaptation will in principle be done by acting on the filters which are contained in the receiver and which are placed between the reception antenna and an output of the receiver. But instead of optimizing just the radio link composed of a pair of UWB devices, it is also possible to envisage an optimization strategy at the network level, for example by implementing an appropriate routing of the information in multi-hops while avoiding passing through links penalized by interactions identified as too unfavorable.

The environmental characterization functionality within a UWB communication network can also be utilized in any case where the environmental characterization makes it possible to enrich the information exchanged between the nodes of the network, so as to provide a service which is additional or complementary to the communication function, and/or to improve the quality of the communication of a network.

For example, a UWB wireless network of temperature sensors can trigger an action (such as turning on the heating) as a function of the ambient temperature (measured at certain nodes of the network) but also as a function of the volume of the environment estimated by the environmental characterization function.

In all cases, the data measured by the sensor network and exchanged between the nodes is enriched by the information about the environment.

In the maximum inter-correlation search process making it possible to culminate in the selection of a determined interaction, it will be understood that it is possible to introduce various actions making it possible to reduce the calculation times. In particular, it is desirable to eliminate the correlation calculations which culminate in solutions which make no sense having regard to what is already known about the environment. For example, if at least one path has already been estimated in the set of estimations retained for the current path, it is possible to eliminate configurations giving rise to a zero probability (that is to say impossible configurations).

Another possible scheme for limiting the inter-correlation calculations consists in adjusting the number N of estimations retained according to the relative level of inter-correlation. For example, N will be taken small when few configurations are characterized by inter-correlation values that are very high with respect to the remaining configurations (that is to say high relative discrepancies). Conversely, a significant number N of candidates will be considered in the estimation when the relative discrepancies of the inter-correlation values are small.

The system for aiding environmental characterization according to the invention is represented in FIG. 12 in an exemplary context. Only two nodes of the UWB communication network are represented so as not to overburden the representation and, for these two nodes which in principle each comprise both an emitter and a receiver, only an emitter has been represented for one of the nodes and only a receiver has been represented for the other node.

An ultra-wideband emitter EMT and an ultra-wideband receiver RCV are placed in a rectangular room whose walls are reflecting in respect of the electromagnetic waves emitted. This is a geometric test configuration. Only the four walls of the room and the significant paths present in the horizontal plane of the radio link are demarcated. Without loss of generality, here one and the same orientation is chosen for the two antennas (and therefore one and the same angular reference for the definition of the directions of emission and reception). The emitter comprises an emission antenna ANT-E placed at a first position in the room. The receiver comprises a reception antenna ANT-R placed at a second position in the room. The antennas have been represented symbolically by an ellipse whose longitudinal axis represents a characteristic axis of the antenna.

An electromagnetic signal pulse emitted by the emitter can reach the receiver in various possible ways. Only a direct path and simple reflections have been represented. Possible multiple reflections have not been represented, and neither have reflections (even simple ones) on the ground or on the ceiling of the room.

Seen as a bold solid line in FIG. 12 is a direct path, along the line which joins the centers of the antennas, this line having an orientation at an angle AE0 with respect to the characteristic axis of the emission antenna (the angle is represented for convenience in the form of its $2\pi$ complement because of the fact that it is greater than $\pi$ in this example), and an orientation at an angle AR0 with respect to the characteristic axis of the reception antenna.

Also seen is a first path with reflection on the right wall, with respective angles AE1 for emission (represented here again by its $2\pi$–AE1 complement) and AR1 for reception.

And then a path with reflection on the wall at the top of the figure with respective angles AE2 and AR2. The antennas not necessarily being symmetric with respect to their characteristic radioelectric axis, the angles are oriented (with the following convention: the angles are positive in the counter-clockwise direction).

The receiver receives analog signals from the antenna ANT-R. These analog signals are preamplified, filtered, and then digitized by a first analog processing circuit forming part of the receiver, this first circuit being designated by the reference NUM.

The digitized signals are processed by a calculation processor CALC which comprises notably calculation means and programs that are necessary for performing searches for maximum inter-correlation. Predicted elementary waveforms are stored in a memory MEM. Other complex waveforms can also be calculated on the fly on the basis of these elementary and a priori deterministic waveforms. It is these predicted waveforms (elementary and/or complex) which will form the subject of the inter-correlation with the digitized signal received, in at least one temporal portion.

The calculator CALC comprises
- calculation programs for determining one or more temporal portions of the digitized signal waveform which, because of their temporal distribution of energy, are apt to contain one of the predicted waveforms,
- calculation programs for comparing the digitized signal received in at least one of these temporal portions with several of the predicted waveforms whose descriptors are in the memory MEM or calculated on the fly; these programs are preferably programs for searching for maximum temporal correlation for each predicted waveform, they determine which is the time-slip of a predicted waveform on a received waveform which gives the highest correlation value in absolute value and what this value is,
- a program for selecting at least one descriptor for which the comparison indicates a resemblance between the predicted form and the temporal portion of form received; for a simple exemplary implementation, this program determines at least the maximum of the inter-correlation maxima,
- and means for storing, in the memory MEM or in another memory, an item of information regarding the descriptor thus selected.

The electronic calculation circuits (CALC, MEM notably) are not necessarily located in the receiver of the communication node comprising the reception antenna. They can very well be elsewhere, for example at the level of another node, or of a central station.

Figure 13:
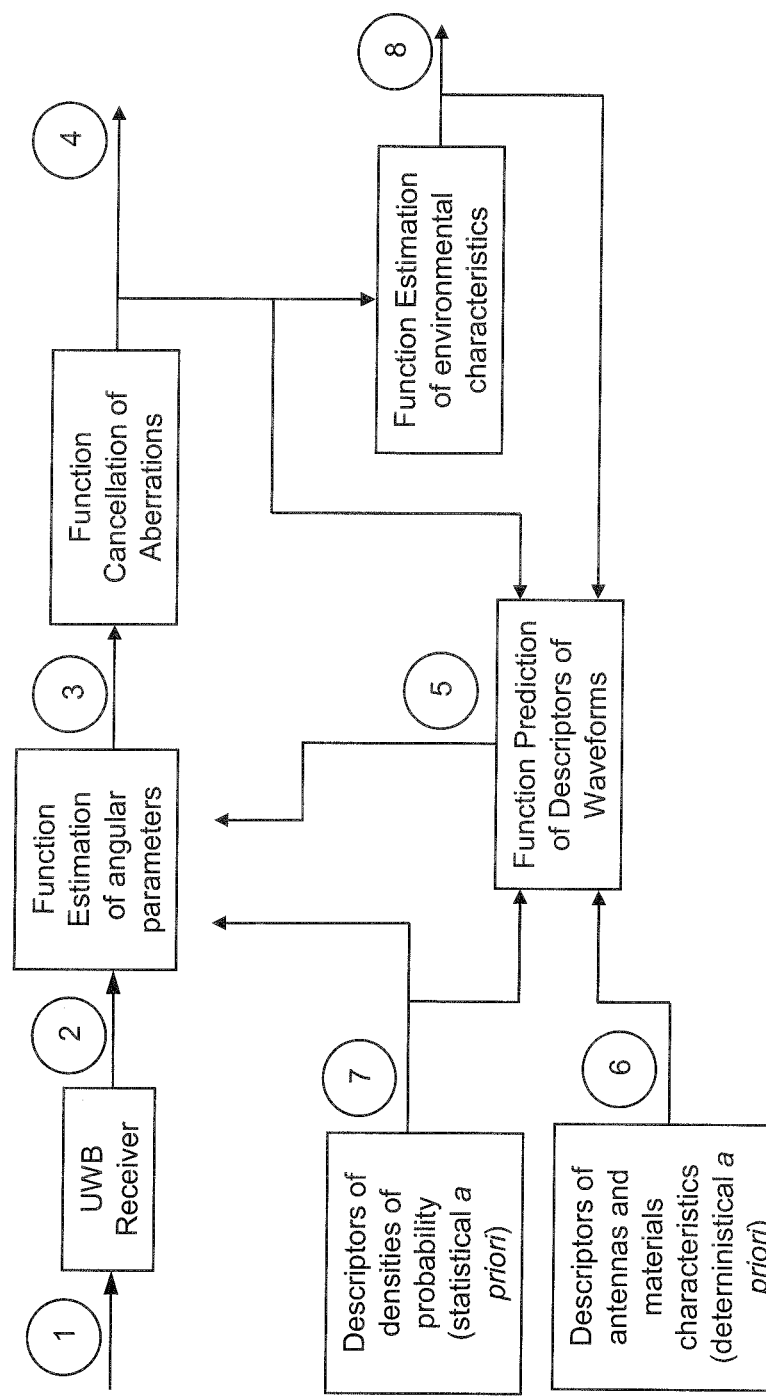
FIG. 13 represents a chart of the operations performed in a mode of implementation of the method according to the invention.
Figure 14:
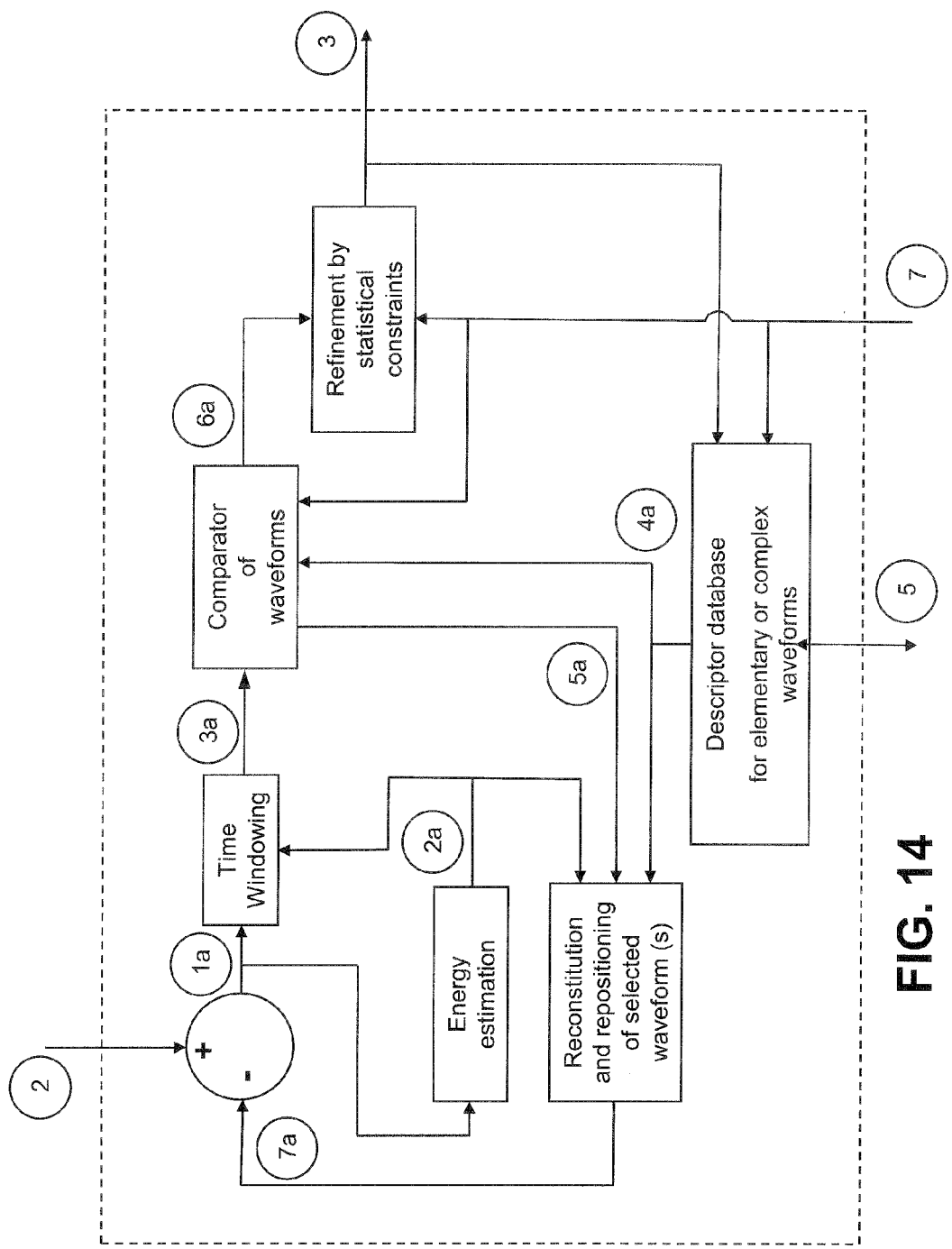
FIG. 14 represents a chart of the operations more precisely for the angles estimation function.

To summarize the principles of the present invention, these principles have been schematically represented in FIGS. 13 and 14.

In FIG. 13, the general principle is set forth. The radiofrequency signal 1 is received by a UWB receiver which provides a digitized image 2 thereof, whose form depends notably on the response characteristics of the reception antenna as well as the deformations due to the interactions encountered. The image signal undergoes a processing for estimating angular parameters (direction of departure/arrival, angles of incidence on the reflecting surfaces) making it possible to provide at 3 a raw estimation of at least one triple of angular parameters for each resolved path. By virtue of the utilization of the geometric constraints, impossible configurations (that is to say configurations which fall outside the domain of the probability density utilized) are rejected. Consequently, at 4 all the non-impossible estimated configurations are retrieved.

This or these triples are processed by a function for estimating environmental characteristics, which makes it possible to provide, at 8, environmental characteristics such as the position and the orientation of the reflecting walls as well as the nature of the walls.

If this involves predicting at 5 a set of possible elementary waveforms, the algorithm can be optimized by using the geometric constraints, so as to limit the number of elementary waveforms. A priori electromagnetic knowledge that one possesses can also be used for this prediction. This knowledge is of two kinds: deterministic a priori knowledge at 6 (about the antennas, their response, about the electromagnetic characteristics of the materials which may engender reflections, etc.) or else statistical a priori knowledge at 7 (probability of having such an interaction as a function of the wave's arrival time, probability of having such angles of incidence at the surfaces as a function of the nature of the geometry of the room, etc.). This knowledge can serve for the prediction of elementary waveforms which are used by the function for estimating angular parameters (direction of departure/arrival, angles of incidence on the reflecting surfaces), notably in the operation of searching for the resemblance maxima, but they can also serve directly in the function for estimating angular parameters to limit the calculations performed. For example, a low probability of having this or that triple of angular parameters in an indoor scenario can serve to eliminate very implausible solutions.

In FIG. 14, the chart represents in greater detail the function for estimating angular parameters (direction of departure/arrival, angles of incidence on the reflecting surfaces) which receives at 2 the image signal formulated in the receiver (cf. FIG. 13). If one proceeds iteratively as explained previously, a subtraction is operated in a subtracter which receives the signal together with a waveform (at 7a) reconstructed and adjusted temporally in the time window analyzed previously. The result of the subtraction, at 1a, undergoes at each iteration a new temporal windowing which is defined as a function of an estimation of energy of the signal at 1a resulting from the subtraction.

An energy estimation function establishes at 2a a window definition command which moreover serves for the temporal adjustment of the waveform reconstructed after the resemblance search so that the subtraction is synchronized with respect to the window analyzed. The windowing command can result from the detection of temporal position of an energy spike in the waveform received at 1a.

The signal after windowing (at 3a) is used in the comparisons with the predicted waveforms; a subset of predicted waveforms is provided at 4a by a database of elementary waveforms. The content of the database serves not only in the steps of the comparison (by correlation or otherwise) but also in the reconstruction of the waveform to be subtracted in the iterative process. The elementary waveforms are selected (at 5) from among all the forms stored, as a function of the prediction performed (cf. FIG. 13).

The waveform comparator provides an estimation of a triple of angular parameters at 6a, which estimation may, however, still comprise an ambiguity between the emitter and the receiver on account of the symmetry of electromagnetic propagation. The estimation at 6a can be refined, so as notably to remove this ambiguity, by implementing statistical constraints provided at 7, and it is only after this refinement that a triple of angular parameters is provided at 3 by the function for estimating angular parameters. The waveform comparator also provides elements (at 5a), such as an estimated amplitude and estimated signal polarity, which can serve for the reconstruction of the predicted waveform with a view to its subtraction.

As regards the comparison of waveforms, the case where this comparison is made by successive steps of inter-correlation calculations was described previously in detail. It will be noted that any device and/or scheme enabling the reference waveforms to be contrasted with the image of the signal received and windowed with a view to restoring the triple of angular parameters corresponding to the paths detected can be used in substitution. By way of example, a neural network can be envisaged for training reference waveforms with an input vector composed of samples arising from these waveforms, or else any appropriate representation of these waveforms (for example coefficients for decomposition according to a basis of wavelet functions, etc.)

To specify the use of statistical a priori knowledge, mentioned above with reference to FIG. 13, it is possible to give an example in a simple two-dimensional (2D) case. Let us assume that an emitter and a receiver are in a rectangular room, the ratio between the two dimensions of the rectangle being $R_D$. Let us thus assume that the coordinates of these two nodes are distributed as uniform variables in the room, then it is possible to write the joint probability density of the angles of incidence on the surfaces.

By denoting by $$(\theta_{i,1}, \theta_{i,2}, \theta_{i,3}, \theta_{i,4})$$

the angles of incidence on the surfaces of the rectangular room, then their joint probability density can be written as follows:

$$f_\Theta(\theta_{i,1}, \theta_{i,2}, \theta_{i,3}, \theta_{i,4}) = \xi \frac{\gamma(\theta_{i,1})\gamma(\theta_{i,2})\gamma(\theta_{i,3})\gamma(\theta_{i,4}) \tan\theta_{i,1}\tan\theta_{i,2}\tan\theta_{i,3}\tan\theta_{i,4}}{(\tan\theta_{i,1}+\tan\theta_{i,3})^3(\tan\theta_{i,2}+\tan\theta_{i,4})^3}$$

if the angles belong to a domain $\mathcal{D}$:

$$(\theta_{i,1}, \theta_{i,2}, \theta_{i,3}, \theta_{i,4}) \in \mathcal{D}$$

with $$\gamma(\theta_{i,n}) = 1 + \tan^2(\theta_{i,n})$$

and $$\xi = \int_D \frac{\gamma(\theta_{i,1})\gamma(\theta_{i,2})\gamma(\theta_{i,3})\gamma(\theta_{i,4})\tan\theta_{i,1}\tan\theta_{i,2}\tan\theta_{i,3}\tan\theta_{i,4}}{(\tan\theta_{i,1}+\tan\theta_{i,3})^3(\tan\theta_{i,2}+\tan\theta_{i,4})^3} d\theta_{i,1} d\theta_{i,2} d\theta_{i,3} d\theta_{i,4}$$

The domain D is defined implicitly by the following system of inequalities:

$$\begin{cases} R_D\tan\theta_{i,2}\tan\theta_{i,3} + R_D\tan\theta_{i,1}\tan\theta_{i,2} - \tan\theta_{i,1}\tan\theta_{i,2}\tan\theta_{i,3} - \\ \quad \tan\theta_{i,1}\tan\theta_{i,3}\tan\theta_{i,4} > 0 \\ \tan\theta_{i,3}\tan\theta_{i,4} + \tan\theta_{i,2}\tan\theta_{i,3} - R_D\tan\theta_{i,1}\tan\theta_{i,2}\tan\theta_{i,4} - \\ \quad R_D\tan\theta_{i,2}\tan\theta_{i,3}\tan\theta_{i,4} > 0 \\ R_D\tan\theta_{i,1}\tan\theta_{i,2}\tan\theta_{i,4} + R_D\tan\theta_{i,2}\tan\theta_{i,3}\tan\theta_{i,4} - \\ \quad \tan\theta_{i,1}\tan\theta_{i,4} - \tan\theta_{i,1}\tan\theta_{i,2} < 0 \\ \tan\theta_{i,1}\tan\theta_{i,3}\tan\theta_{i,4} + \tan\theta_{i,1}\tan\theta_{i,2}\tan\theta_{i,3} - R_D\tan\theta_{i,3}\tan\theta_{i,4} - \\ \quad R_D\tan\theta_{i,1}\tan\theta_{i,4} < 0 \end{cases}$$

For any value of $(\theta_{i,1}, \theta_{i,2}, \theta_{i,3}, \theta_{i,4})$ not being in D, the joint density $$f_\Theta(\theta_{i,1},\theta_{i,2},\theta_{i,3},\theta_{i,4})$$

equals 0. It is then possible to eliminate the descriptors giving rise to geometric aberrations (that is to say for which the evaluation of the joint density of the angles of incidence is zero) by relying on a priori statistics.

In summary the invention makes it possible:

a) to estimate the directions of departure and arrival, and the angles of incidence on the reflecting surfaces, associated with paths having undergone particular interaction histories (for example a direct path, a simple reflection, etc.) for a point-to-point radio link between two UWB devices on the basis of a single antenna per device and by relying on simultaneous wireless communications links (as opposed to the traditional techniques of radar sounding, multi-antennas, and/or antenna scanning);

b) to estimate environmental parameters of the propagation medium under the same conditions as at the point a (for example presence of reflecting surfaces and position of the reflection points, dielectric nature of these surfaces, orientation of these surfaces, etc.);

c) to provide a local mapping of the environment (that is to say on the scale of the room) on the basis of the estimation (potentially joint) of the directions of departure and arrival, of the angles of incidence on the reflecting surfaces and/or of the arrival times of the paths under the same conditions as at point a;

d) to estimate the (relative) position of the pair of UWB radio devices within the room that they occupy, under the same conditions as at a;

e) based on prior knowledge of the plan of the building and on the previous step, to position without infrastructure or additional reference nodes (whose positions would be known a priori) the pair of UWB radio devices within the building that they occupy (the positioning being potentially absolute), under the same conditions as at a;

f) based on one or more of the previous points, and on UWB communication links, to exchange the available information (for example the absolute and/or relative positions of the nodes, the local mappings of the building, etc.) and to ensure the relaying of this information at any point of the network composed of UWB devices;

g) on the basis of the point a, and by using at reception any technique allowing the system to be spatially adapted to the favored directions in space allotted to the most energetic paths (for example beam formation, sectorized antennas, reconfigurable antennas, deforming antennas etc., and associated algorithms) to improve the quality (that is to say the signal-to-noise ratio) and/or the security of the radio link;

h) under the same conditions as at g, to improve performance in estimating relative distance, positioning, and/or tracking of mobile nodes.

The communication system will optionally comprise specific means according to the application which is envisaged, notably in the following cases:

when the information obtained about the environment is used to optimize the routing of the communications in the network;

when the information must serve to aid the orientation of the blind or of persons placed in conditions of poor visibility (presence of smoke, absence of light) in a building;

when the information serves to optimize a spatial equalization of a high fidelity music rig or of some other public address sound system in a building;

when the information serves to detect changes that have arisen in the environment and notably in a building in relation to physical parameters such as the temperature or the presence of gas or smoke or else the presence of intruders, including for the production of an alarm.

The invention claimed is:

1. A method for aiding environmental characterization using an ultra-wideband multi-node wireless communication network, comprising the emission of impulse radiofrequency signals by a radio emitter node having an emission antenna and the reception of the corresponding signal by a radio receiver node different from the emitter node and having a reception antenna, the method comprising the following steps, carried out by an electronic computer processor:

the storage, in a memory associated with the receiver, of a series of descriptors of predicted elementary waveforms, each descriptor corresponding to an elementary waveform expected at the level of the receiver for a determined interaction between the electromagnetic wave emitted by the emission antenna and constituent materials of surfaces potentially present in the environment which may affect the propagation of the wave up to the receiver, the digitization of the signal received and the determination of one or more temporal portions of the waveform of signal received which, because of their temporal distribution of energy, are apt to contain one of the predicted waveforms and to correspond to the arrival of one and the same impulse signal having followed several paths of different orientations between the emitter node and the receiver node, the comparison between on the one hand a descriptor of the signal received for each of these temporal portions and on the other hand several descriptors of predicted waveforms, which descriptors are stored in the memory or calculated on the fly on the basis of the stored descriptors, these descriptors being dependent on an angle of emission and/or of reception, the selection for each temporal portion of one descriptor for which the comparison indicates a resemblance between the predicted form and the temporal portion of form received, the storage of an item of information about each descriptor thus selected and about the position over time of the corresponding temporal portion, representing an item of information regarding presence and position in the environment of a noteworthy object which causes an interaction corresponding to the interaction associated with the selected descriptor, wherein certain descriptors of predicted waveform are each associated with a triple of determined angular parameters, which are a direction of emission, referenced with respect to the emission antenna, and a direction of reception, referenced with respect to the reception antenna, an angle of incidence on a reflecting surface, referenced with respect to the direction normal to the surface, and with an electromagnetic parameter which carries an item of information about the type of material constituting the reflecting surface, the waveform associated with this descriptor being the waveform predicted in the case where the reception antenna receives along said direction of reception an impulse electromagnetic wave emitted by the emission antenna along said direction of emission, after a reflection at this angle of incidence on a surface whose electromagnetic characteristics are represented by said electromagnetic parameter.

2. The method as claimed in claim 1, wherein the presence and position information represents a position and an orientation of a surface reflecting the electromagnetic waves, the position being the intersection of a straight line passing through the emission antenna and directed along the direction of emission corresponding to the selected descriptor and of a straight line passing through the reception antenna and directed along the direction of reception corresponding to the selected descriptor, and the orientation being that of a plane perpendicular to the bisector of these two straight lines.

3. A method for aiding environmental characterization using an ultra-wideband multi-node wireless communication network, comprising the emission of impulse radiofrequency signals by a radio emitter node having an emission antenna and the reception of the corresponding signal by a radio receiver node different from the emitter node and having a reception antenna, the method comprising the following steps, carried out in an electronic computer processor:

the storage, in a memory associated with the receiver, of a series of descriptors of predicted elementary waveforms, each descriptor corresponding to an elementary waveform expected at the level of the receiver for a determined interaction between the electromagnetic wave emitted by the emission antenna and constituent materials of surfaces potentially present in the environment which may affect the propagation of the wave up to the receiver, the digitization of the signal received and the determination of one or more temporal portions of the waveform of signal received which, because of their temporal distribution of energy, are apt to contain one of the predicted waveforms and to correspond to the arrival of one and the same impulse signal having followed several paths of different orientations between the emitter node and the receiver node, the comparison between on the one hand a descriptor of the signal received for each of these temporal portions and on the other hand several descriptors of predicted waveforms, which descriptors are stored in the memory or calculated on the fly on the basis of the stored descriptors, these descriptors being dependent on an angle of emission and/or of reception, the selection for each temporal portion of one descriptor for which the comparison indicates a resemblance between the predicted form and the temporal portion of form received, the storage of an item of information about each descriptor thus selected and about the position over time of the corresponding temporal portion, representing an item of information regarding presence and position in the environment of a noteworthy object which causes an interaction corresponding to the interaction associated with the selected descriptor, said method wherein certain waveform descriptors are associated with a triple of angular parameters which are a direction of emission referenced with respect to the emission antenna, a direction of reception referenced with respect to the reception antenna, and an angle of incidence on a reflecting surface, referenced with respect to the direction normal to the surface.

4. The method as claimed in claim 3, wherein the temporal position of a portion of waveform received, for which a descriptor has been selected, is determined and used to establish or confirm the information regarding position of the noteworthy object.

5. The method as claimed in claim 3, wherein certain descriptors are associated with particular materials and represent the predicted waveforms associated with an electromagnetic wave diffraction on the edges of objects made from these materials.

6. The method as claimed in claim 3, wherein, the memory contains descriptors of electromagnetic characteristics of the antennas used and of various materials and descriptors of probability distributions induced by certain geometric constraints.

7. The method as claimed in claim 3, wherein the receiver provides, in a facility for predicting waveforms, descriptors of complex waveforms on the basis of descriptors contained in the memory.

8. The method as claimed in claim 3, wherein the comparison between the waveform of signal received and the predicted waveforms whose descriptors are in the memory is done by comparing descriptors stored in the memory and descriptors calculated by the receiver on the basis of the waveform received.

9. The method as claimed in claim 3, wherein the digitization of waveforms of signal received is performed for a series of pulses emitted successively by the emission antenna.

10. The method as claimed in claim 9, wherein the series of pulses is a series emitted during the header of a communication message sent by the radio emitter node to the radio receiver node, so as to perform an environmental characterization during the current use of the communication network.

11. The method as claimed in claim 3, wherein, after selection of a particular descriptor for a determined temporal portion of the waveform received, the predicted waveform corresponding to this descriptor is subtracted from the waveform received, while tailoring it to this temporal portion, and the determination of temporal portions and the comparison with predicted forms is recommenced, using the result of this subtraction as signal received.

12. The method as claimed in claim 11, wherein the subtraction, the determination of temporal portions and the comparison with predicted forms is iteratively recommenced.

13. The method as claimed in claim 11, wherein the determination of temporal portions and the comparison with predicted waveforms are performed in parallel for several choices of descriptors corresponding to one and the same wave propagation path.

14. The method as claimed in claim 3, wherein the radio emitter node emits several identical successive impulse signals shifted by determined time intervals, a coherent integration of the signals received is performed by compensating at the receiver level for the time intervals which separate them, so as to produce an equivalent signal received having an improved signal/noise ratio, and the waveform of this equivalent signal received is used to perform the comparisons with the predicted waveforms.

15. The method as claimed in claim 3, comprising an iteration of the calculations for each time window corresponding to a noteworthy wave path present in the signal received, and the estimation of a probable environmental configuration as a function of the information detected for each time window.

16. A wireless communication system comprising a network of several ultra-wideband emission/reception nodes, including at least one node having an emission antenna so as to emit in the network impulse communication signals, and at least one node, different from the emitter node and having a reception antenna capable of receiving signals corresponding to the signals emitted, the system comprising:

a memory containing a series of descriptors of predicted waveforms, each descriptor corresponding to an elementary signal waveform expected at the receiver node for a determined interaction between the electromagnetic wave emitted by the emission antenna and objects potentially present in the environment which may affect the transmission of this wave in its path up to its reception by the receiver, digitization means for digitizing the waveform of a signal received and means for determining one or more temporal portions of the waveform of signal received which, because of their temporal distribution of energy, are apt to contain one of the predicted waveforms and to correspond to the arrival of one and the same impulse signal having followed several paths of different orientations between the emitter node and the receiver node, comparison means for comparing between on the one hand a descriptor of the signal received for each of these temporal portions and on the other hand several descriptors of predicted waveforms, which descriptors are stored in the memory or calculated on the fly on the basis of the stored descriptors, means for selecting, for each temporal portion, a descriptor for which the comparison indicates a resemblance between the corresponding predicted form and the temporal portion of signal received, and means for storing an item of information about each descriptor thus selected and the position over time of the corresponding temporal portion, representing an item of information regarding presence and position in the environment of a noteworthy object which causes an interaction corresponding to the interaction associated with the selected descriptor, wherein certain waveform descriptors are associated with a triple of angular parameters which are a direction of emission referenced with respect to the emission antenna, a direction of reception referenced with respect to the reception antenna, and an angle of incidence on a reflecting surface, referenced with respect to the direction normal to the surface.

17. The system as claimed in claim 16, comprising a function or predicting descriptors of complex waveforms on the basis of the descriptors of elementary waveforms and of descriptors of electromagnetic characteristics of materials, the two sets of descriptors being contained in the memory.

18. The system as claimed in claim 16, comprising means for iterating the calculations for each time window corresponding to a noteworthy wave path present in the signal received, and the estimation of a probable environmental configuration as a function of the information detected for each temporal portion.

* * * * *